US010945040B1

(12) United States Patent
Bedi et al.

(10) Patent No.: US 10,945,040 B1
(45) Date of Patent: Mar. 9, 2021

(54) GENERATING AND PROVIDING TOPIC VISUAL ELEMENTS BASED ON AUDIO CONTENT AND VIDEO CONTENT OF A DIGITAL VIDEO

(71) Applicant: Adobe Inc., San Jose, CA (US)

(72) Inventors: Ajay Bedi, Hamirpur (IN); Sunil Rawat, Faridabad (IN); Rishu Aggarwal, Delhi (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/653,541

(22) Filed: Oct. 15, 2019

(51) Int. Cl.
*H04N 9/80* (2006.01)
*H04N 21/47* (2011.01)
*G11B 27/30* (2006.01)
*G10L 15/26* (2006.01)
*H04N 21/431* (2011.01)
*H04N 5/93* (2006.01)

(52) U.S. Cl.
CPC ............. *H04N 21/47* (2013.01); *G10L 15/26* (2013.01); *G11B 27/309* (2013.01); *H04N 21/4316* (2013.01)

(58) Field of Classification Search
CPC .......... H04N 5/44591; H04N 21/23424; G10L 15/265; G11B 27/309; G06F 16/4393
USPC ............ 386/241, 278, 285; 715/732; 725/32
See application file for complete search history.

(56) References Cited

U.S. PATENT DOCUMENTS

| | | | | |
|---|---|---|---|---|
| 2008/0034104 | A1* | 2/2008 | Kariti .................... | H04L 41/509 709/231 |
| 2014/0033250 | A1* | 1/2014 | Kennedy ............ | H04N 21/4402 725/32 |
| 2016/0012859 | A1* | 1/2016 | Harader ................. | G11B 27/34 386/241 |
| 2016/0124909 | A1* | 5/2016 | Basson ................... | G10L 21/16 715/732 |

OTHER PUBLICATIONS

Tomas Mikolov et al.; "Efficient Estimation of Word Representations in Vector Space"; Submitted on Jan. 16, 2013 (v1), last revised Sep. 7, 2013 (this version, v3); Cornell University—arXiv:1301.3781v3.

* cited by examiner

*Primary Examiner* — Robert Chevalier
(74) *Attorney, Agent, or Firm* — Keller Jolley Preece

(57) ABSTRACT

The present disclosure relates to methods, systems, and non-transitory computer-readable media for generating a topic visual element for a portion of a digital video based on audio content and visual content of the digital video. For example, the disclosed systems can generate a map between words of the audio content and their corresponding timestamps from the digital video and then modify the map by associating importance weights with one or more of the words. Further, the disclosed systems can generate an additional map by associating words embedded in one or more video frames of the visual content with their corresponding timestamps. Based on these maps, the disclosed systems can identify a topic for a portion of the digital video (e.g., a portion currently previewed on a computing device), generate a topic visual element that includes the topic, and provide the topic visual element for display on a computing device.

20 Claims, 12 Drawing Sheets

GENERATING AND PROVIDING TOPIC VISUAL ELEMENTS BASED ON AUDIO CONTENT AND VIDEO CONTENT OF A DIGITAL VIDEO

BACKGROUND

Recent years have seen significant advancements in hardware and software platforms for presenting digital videos to users. For example, many conventional video presentation systems implement a platform accessible by users via a client device in order to upload, search for, interact with, comment on, and/or view digital videos. Such conventional systems often present, along with a digital video, information about the video (e.g., a title, a brief description, etc.) to inform a user of the contents of the video. In many cases, as a cursor hovers over a scrub bar (i.e., a seek bar or video progress bar) associated with a digital video, a conventional system may provide a preview thumbnail depicting a scene associated with the position of the cursor. Accordingly, the conventional system enables the user to preview the contents of a portion of the digital video based on the provided preview thumbnails. Although conventional systems can provide preview thumbnails for informing users, such systems often fail to flexibly provide additional detail when a preview thumbnail is uninformative, resulting in an inaccurate portrayal of the contents of a portion of the digital video and wasted resources due to inefficient video navigation.

SUMMARY

One or more embodiments described herein include systems, methods, and non-transitory computer-readable media that generate video topic summary elements based on the audio content and visual content of a digital video. The system can provide the video topic summary elements in connection with video thumbnails or as part of a table or contents to allow for informed efficient navigation and exploration of digital videos. For example, in one or more embodiments, the system converts the audio of the digital video to text and indexes the converted text with the frames of the digital video. The system can further determine an importance of words of the converted text. Additionally, the system can analyze the visual content of the digital video to extract words embedded in the video frames. The system can then map words from the converted text with high importance to the extracted words to identify a topic for a portion of the digital video. The system can then provide a visual element (e.g., a textual representation) for the topic, for example, when a user hovers a cursor over a position of a scrub bar associated with the portion of the digital video. In this manner, the system can flexibly generate visual elements that accurately convey the topic associated with a given portion of a digital video.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
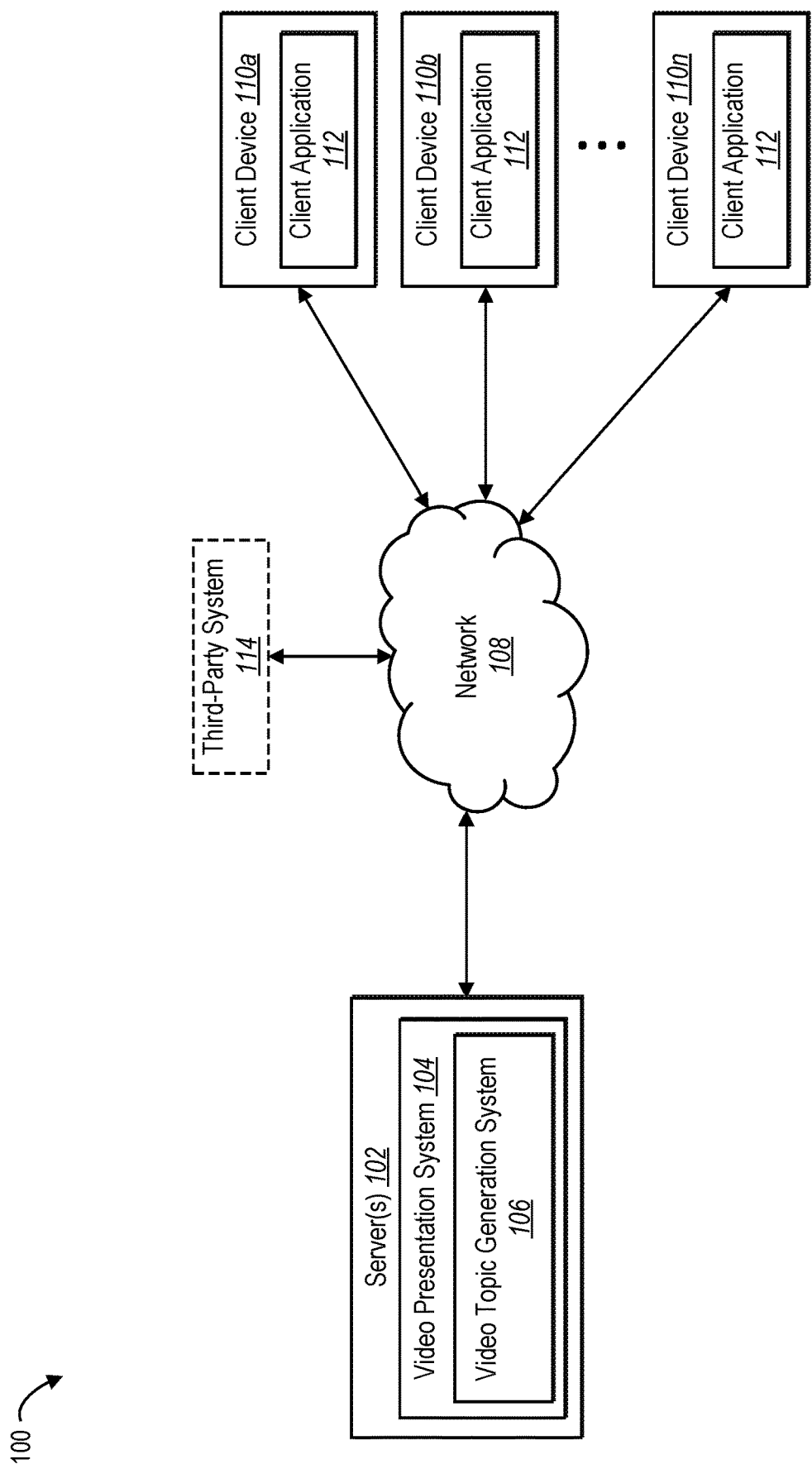
FIG. 1 illustrates an example system including a video topic generation system in accordance with one or more embodiments.

One or more embodiments described herein include a video topic generation system that generates visual elements that accurately convey the topic of a given portion of a digital video based on the audio content and visual content of the digital video. For example, in one or more embodiments, the video topic generation system converts the audio of the digital video to text and indexes the converted text with the frames of the digital video. The video topic generation system can further determine an importance of words of the converted text. Additionally, the video topic generation system can analyze the visual content of the digital video to extract words embedded in the video frames. The video topic generation system can then map words from the converted text with high importance to the extracted words to identify a topic for a portion of the digital video.

To provide an example, in one or more embodiments, the video topic generation system identifies a digital video that includes visual content and audio content. The video topic generation system can generate a transcript map based on the audio content by associating words of the audio content with timestamps of the digital video. The video topic generation system can further modify the transcript map by determining and associating importance weights with the words of the audio content. Additionally, the video topic generation system can generate an embedded text map based on the visual content by associating embedded words from video frames of the digital video with corresponding timestamps. Based on the modified transcript map and the embedded text map, the video topic generation system can generate a topic visual element for a portion of the digital video and provide the visual topic element for display on a computing device.

As just mentioned, in one or more embodiments, the video topic generation system generates a topic visual element based in part on audio content of a digital video. Indeed, in one or more embodiments, the video topic generation system uses speech-to-text conversion to generate text corresponding to the words of the audio content. The video topic generation system can generate a transcript map by associating the words of the audio content (i.e., the text representing the words) with timestamps of the digital video. In particular, for a given word, the video topic generation system can associate that word with the timestamp of the digital video at which the audio of the word was provided.

The video topic generation system can further generate quantitative values representing the importance of the words of the audio content (i.e., importance weights). For example, in one or more embodiments, the video topic generation system analyzes the transcript map to determine a frequency of the words of the audio content using a term frequency-inverse document frequency model. The video topic generation system can then associate importance weights with the words based on the frequency. For example, in one or more embodiments, based on the frequency of the words (e.g., for words that satisfy a frequency threshold), the video topic generation system utilizes a summarization machine learning model to generate importance weights for the words. The video topic generation system can modify the transcript map by associating the importance weights with those words within the transcript map.

As also mentioned, in one or more embodiments, the video topic generation system generates the topic visual element further based on the visual content of the digital video. In particular, the video topic generation system can analyze the visual content to identify and extract words that are embedded in (e.g., displayed in) the video frames of the digital video. In one or more embodiments, the video topic generation system analyzes the visual content using optical character recognition. The video topic generation system can generate an embedded text map by associating the embedded words from the video frames to their corresponding timestamps.

As further mentioned above, in one or more embodiments, the video topic generation system generates a topic visual element for a portion of the digital video based on the modified transcript map and the embedded text map. In particular, for a give portion of the video, the video topic generation system can identify a match between a word from the modified transcript map and a word from the embedded text map. In one or more embodiments, the video topic generation system identifies the match by comparing words from the modified transcript map that correspond to the portion of the digital video and have a high importance weight to words from the embedded text map that correspond to the portion of the digital video. The video topic generation system can generate the topic visual element based on the identified match(es).

In one or more embodiments, upon identifying multiple matches, the video topic generation system can determine a subtopic for the portion of the digital video. In particular, the video topic generation can assign the matching word with the highest importance weight as the topic and the matching word with the next highest importance weight as the subtopic. Accordingly, the video topic generation system can generate the topic visual element to include the topic and the subtopic.

In some embodiments, the video topic generation may not identify any matches, for a give portion of the video, between words from the modified transcript map and words from the embedded text map. In such embodiments, the video topic generation system can generate a topic based on a top-weighted word from the modified transcript map that corresponds to the portion of the digital video.

In one or more embodiments, the video topic generation system generates the topic visual element for a portion of a digital video in real time. For example, the video topic generation system can generate the topic visual element in response to detecting that an input indicator (e.g., a cursor or touch gesture) is positioned at a particular point on a scrub bar corresponding to the digital video. Based on the particular point of the scrub bar, the video topic generation system can identify a corresponding range of times stamps. The video topic generation system can then determine a topic for the portion of the video corresponding to the range of time stamps. The video topic generation system can provide a topic visual element for display while the input indicator is positioned at the point of the scrub bar associated with the portion of the digital video. In some embodiments, however, the video topic generation system generates the topic visual element at some time before a user views the digital video.

In some embodiments, the video topic generation system generates a table of contents that includes the topics (and subtopics, if applicable) of the digital video. The video topic generation system can provide the table of contents for display, for instance, as an initial frame of the digital video. In one or more embodiments, the video topic generation system further configures the table of contents so that a user can navigate the digital video upon selecting one of the included topics (or subtopics).

As mentioned above, conventional video presentation systems suffer from several technological shortcomings that result in inflexible, inaccurate, and inefficient operation. For example, conventional video presentation systems typically rigidly provide preview thumbnails that include a visual representation a frame of the video. As these thumbnails are small they make it difficult to determine the theme or topic of the video. These shortcomings are exacerbated when the digital video does not include a significant change in scenery across large portions of the video (e.g., where the digital video presents an academic lecture or other presentation where a speaker stands at a podium throughout the duration of the digital video). Thus, a user attempting to navigate the digital video using the scrub bar may be presented with various preview thumbnails that look similar and do not allow the user to determine a topic at a given point in the video.

Some conventional video presentation systems attempt to address these concerns by providing URLs (e.g., within a description area for the digital video) that enable a user to navigate to a desired portion of the digital video. Some conventional systems provide tags (e.g., within the digital video itself) to inform the user of the current topic of the digital video. However, these methods often require a user (e.g., the creator of the digital video) to manually create and insert the URLs or tags. Further, the conventional systems often rigidly limit the availability of these approaches to the time-of-creation of the digital videos. In other words, conventional systems may prevent a user from providing URLs or tags to a preexisting digital video.

In addition to the foregoing problems, conventional video presentation systems can also operate inefficiently. In particular, as conventional systems typically provide inefficient means for navigating or exploring the digital video. For example, without an accurate portrayal of the topics, the conventional systems typically require a user to watch the entire digital video or to navigate to various portions of the digital video aimlessly before finding the portion that discusses a desired topic. Accordingly, such conventional systems often require a significant amount of computing resources to navigate or find a desired portion of a digital video.

The video topic generation system provides several advantages over conventional systems. For example, the video topic generation system can operate more flexibly than conventional systems. In particular, by generating and providing topic visual elements based on the audio content and visual content of a digital video, the video topic generation system can flexibly convey the topic for a given portion where the scenes of the digital video are largely similar and the preview thumbnails do not change significantly. Additionally, by generating topic visual elements based on the audio content and visual content of digital videos, the video topic generation system can flexibly provide the topic visual elements without requiring manual user input. Further, as mentioned above, the video topic generation system can flexibly generate a topic visual element for a portion of a digital video after the creation of the digital video (e.g., in real time, as a user interacts with the scrub bar).

Further, the video topic generation system can operate more accurately than conventional systems. Indeed, by generating and providing topic visual elements, the video topic generation system can accurately portray the topic for a given portion of the digital video. For example, the video topic generation system can accurately convey at what point the digital video changes topics and the substance of those topics even when the preview thumbnails for the digital video look similar. Additionally, by providing topic visual elements the video topic generation system avoids the ambiguity that may be present within the visual image of the preview thumbnail.

Additionally, the video topic generation system improves efficiency. Indeed, by accurately portraying the topic for a given portion of a digital video via a topic visual element, the video topic generation system enables a user to navigate to a desired portion of the digital video without having to watch large portions (or even the entire video). Accordingly, the video topic generation system reduces the amount of computing time and power used in navigating digital videos.

The video topic generation system can generate topics and topic visual elements for a digital video. A digital video can include visual content (visual data) and audio content (audio data). In some embodiments, a digital video includes other data (e.g., metadata) or features for viewing or otherwise interacting with the visual content and/or audio content. Indeed, in some embodiments, a digital video includes a digital file that contains the visual content, audio content and/or other data.

In one or more embodiments, the video topic generation system can generate topics and topic visual elements from visual content and audio content. Visual content can include digital data representing the frames of the digital video. In some embodiments, the visual content includes one or more digitally-captured or digitally-reproduced visual elements of a digital video. In some embodiments, visual content includes one or more digitally-rendered visual elements, such as visual elements generated using computer-generated imagery.

In one or more embodiments, audio content can include digital data associated with noise or sound. In some embodiments, audio content includes digital data representing words or other discernible noises generally understood by humans as spoken communication. For example, audio content can include digital data representing words (or noises) vocalized by a person, presented via a communications device, presented via audio recording, or generated and presented by a machine. In one or more embodiments, audio content includes digital data representing an audio channel of a digital video.

Additionally, in one or more embodiments, a portion of a digital video includes a segment of the digital video. Indeed, a portion of a digital video can include a segment of the digital video that is shorter in length than the entirety of the digital video. To illustrate, a portion of a digital video can include, but is not limited to, a segment of the digital video delineated by a scene of the digital video, a window of time within the digital video (e.g., a range of timestamps associated with the digital video), or a topic or theme discussed or otherwise portrayed by the digital video. In some embodiments, however, a portion of a digital video can include the entirety of the digital video.

Additionally, in one or more embodiments, a scrub bar includes a visual element representing a time element of a digital video. In some embodiments, a scrub bar includes a progress bar that indicates the current progress of a digital video (e.g., how much of the digital video has played). Indeed, a scrub bar can update as the digital video plays. In some embodiments, however, a scrub bar includes a visual element representing a portion of the digital video that is currently playing relative to the time frame of the digital video. Indeed, the scrub bar can update as a user navigates to different portions of the digital video. The scrub bar can be part of the digital video itself (e.g., included within the digital data corresponding to the digital video). In some instances, the scrub bar is provided by a video presentation system.

Further, in one or more embodiments, a topic visual element includes a visual element portraying a topic or theme of a portion of a digital video. For example, a topic visual element can include a user interface element that displays (e.g., textually or symbolically) a topic of a portion of a digital video. In one or more embodiments, the topic visual element can further display one or more subtopics corresponding to the topic of the digital video.

In one or more embodiments, an input indicator includes a visual element used to indicate a position of input or potential input within a user interface. For example, an input indicator can include a pointer or cursor (e.g., an arrow or finger) displayed on a user interface to show the placement of input or potential input. An input indicator can be associated with various methods of input that include, but are not limited to, an input peripheral (e.g., a mouse, a keyboard, a joystick, a stylus), a touch gesture, eye tracking, body movement, or voice command.

Additionally, a preview thumbnail (also referred to as a scrub-bar-preview thumbnail or simply thumbnail) includes a visual element representing a portion of a digital video. For example, in one or more embodiments, a preview thumbnail includes a graphical user interface element that displays a video frame associated with a portion of a digital video. In some embodiments, the digital video (or a video presentation system) displays the preview thumbnail in response to detecting an input indicator at a point of a scrub bar associated with the corresponding portion of the digital video.

In one or more embodiments, a transcript map includes an association between characteristics of audio content. For example, in some embodiments, a transcript map includes a mapping between words of the audio content and timestamps of the audio content corresponding to those words (e.g., indicating the time of the video at which the words were spoken or otherwise produced). A transcript map can include a data structure (e.g., a table or vector) that stores the mapping but is not so limited. For instance, a transcript map can include one or more pointers in memory associating stored characteristics of the audio content (e.g., a pointer associated with a word that points to a memory location storing the corresponding timestamp).

In one or more embodiments, an embedded word includes a word displayed by a digital video. In some embodiments, an embedded word includes a word having a visual representation included in the visual content of a digital video. For example, an embedded word can include a word having a textual representation (e.g., the spelling of the word or an abbreviation of the word) or a symbolic representation displayed within one or more video frames of the digital video.

In one or more embodiments, an embedded text map includes an association between characteristics of visual content. For example, in some embodiments, an embedded text map includes a mapping between a word from the visual content (e.g., an embedded word) and a timestamp of the video corresponding to that word (e.g., indicating the time of the video at which the word was displayed). An embedded text map can include a data structure (e.g., a table or vector) that stores the mapping but is not so limited. For instance, an embedded text map can include one or more pointers in memory associating stored characteristics of the visual content (e.g., a pointer associated with an embedded word that points to a memory location storing the corresponding timestamp).

In one or more embodiments, a timestamp includes an indication of time. Indeed, in some embodiments, a timestamp includes a time of an occurrence of a digital video relative to the time frame of the digital video (e.g., where an initializing timestamp corresponds to the beginning of the digital video). For example, a timestamp can indicate a time at which a particular video frame is displayed or particular audio content is provided. A timestamp can be measured using various intervals, such as minutes, seconds, milliseconds, etc.

Additionally, in one or more embodiments, a term frequency-inverse document frequency model includes a computer algorithm or model that analyzes the frequency with which a word occurs within a segment of text (e.g., document or transcript map). For example, a term frequency-inverse document frequency model can analyze a segment of text to determine a frequency with which a word appears in the segment of text. In one or more embodiments, the term frequency-inverse document frequency model offsets the frequency value (e.g., using a weighting factor) based on the appearance of the word in one or more other segments of text (e.g., other documents). A term frequency-inverse document frequency model can represent the frequency with which a word appears using integers or as a fraction or percentage (offset by the appearance of the word in one or more other documents).

Further, in one or more embodiments, a summarization machine learning model includes a computer algorithm or model that generates a value that indicates the importance of a word within a segment of text. For example, a summarization machine learning model can include a computer algorithm that is trained to generate importance weights for words based on training words or training groups of words (e.g., training sentences or other segments of text used for training). After training, the summarization machine learning model can analyze a word and assign the word an importance weight. To illustrate, a summarization machine learning model can include a machine learning model. In particular, a summarization machine learning model can include a classifier.

Moreover, in one or more embodiments, a machine learning model includes a computer representation or an algorithm that can be tuned (e.g., trained) based on inputs to approximate unknown functions. In particular, a machine learning model can include to a model that utilizes algorithms to learn from, and make predictions on, known data by analyzing the known data to learn to generate outputs that reflect patterns and attributes of the known data. For instance, a machine learning model can include, but is not limited to, a neural network (e.g., a convolutional neural network and/or deep learning neural network), decision tree, association rule learning, inductive logic programming, support vector learning, Bayesian network, regression-based model, principal component analysis, and/or a combination thereof.

In one or more embodiments, an importance weight includes an output generated by a summarization machine learning model. For example, in some embodiments, an importance weight includes a value or set of values indicative of an importance or relevance of a word. An importance weight can include a single value, a vector of values, or a matrix of values. In one or more embodiments, a top-weighted word includes a word from a set of words that has an importance weight that is higher than, or at least equal to, the importance weight of the other words from the set of words.

Further, in one or more embodiments, a table of contents includes a set of topics. For example, in some embodiments, a table of contents includes an organized list showing a progression of topics associated with a digital video. In one or more embodiments, a table of contents also includes one or more subtopics that are relevant to a given topic.

Additional detail regarding the video topic generation system will now be provided with reference to the figures. For example, FIG. 1 illustrates a schematic diagram of an exemplary system 100 in which a video topic generation system 106 can be implemented. As illustrated in FIG. 1, the system 100 can include a server(s) 102, a network 108, client devices 110a-110n, and a third-party system 114.

Although the system 100 of FIG. 1 is depicted as having a particular number of components, the system 100 can have any number of additional or alternative components (e.g., any number of servers, client devices, third-party systems, or other components in communication with the video topic generation system 106 via the network 108). Similarly, although FIG. 1 illustrates a particular arrangement of the server(s) 102, the network 108, the client devices 110a-110n, and the third-party system 114, various additional arrangements are possible.

The server(s) 102, the network 108, the client devices 110a-110n, and the third-party system 114 may be communicatively coupled with each other either directly or indirectly (e.g., through the network 108 discussed in greater detail below in relation to FIG. 11). Moreover, the server(s) 102, the client devices 110a-110n, and the third-party system 114 may include a variety of computing devices (including one or more computing devices as discussed in greater detail with relation to FIG. 11).

As mentioned above, the system 100 includes the server(s) 102. The server(s) 102 can generate, store, receive, and/or transmit data, including topic visual elements. For example, the server(s) 102 can identify a digital video (e.g., a digital video hosted on the third-party system 114) accessed by the client device 110a and transmit a topic visual element (e.g., either to the third-party system 114 or directly to the client device 110a) for display on the client device 110a. In one or more embodiments, the server(s) 102 comprises a data server. The server(s) 102 can also comprise a communication server or a web-hosting server.

As shown in FIG. 1, the server(s) 102 can include a video presentation system 104. In particular, the video presentation system 104 can provide functionality by which a user (e.g., a user of one of the client devices 110a-110n) can access, view, search for, and/or interact with digital videos. For example, a client device can access a digital video stored on the video presentation system 104 or access, via the video presentation system 104, a digital video stored on the third-party system 114. In response to determining that the client device has accessed the digital video, the video presentation system 104 can provide options that a user of the client device can use to view and/or interact with the digital video. The video presentation system 104 can further provide options the user can use to search for one or more additional digital videos.

Additionally, the server(s) 102 include the video topic generation system 106. In particular, in one or more embodiments, the video topic generation system 106 utilizes the server(s) 102 to generate topic visual elements corresponding to portions of digital videos. For example, the video topic generation system 106 can utilize the server(s) 102 to identify a digital video accessed by a client device (e.g., one of the client devices 110a-110n) and then provide, to the client device, a topic visual element corresponding to a portion of the digital video.

For example, in one or more embodiments, the video topic generation system 106, via the server(s) 102, identifies a digital video (e.g., accessed by a client device) that includes audio content and visual content. The video topic generation system 106 can, via the server(s) 102, generate a transcript map based on the audio content by associating words of the audio content with timestamps of the digital video. The video topic generation system 106 can further modify the transcript map by associating importance weights with the words of the audio content. The video topic generation system 106 can further generate an embedded text map, via the server(s) 102, based on the visual content by associating embedded words from video frames of the digital video with corresponding timestamps. Via the server(s) 102, the video topic generation system 106 can generate a visual topic element based on the modified transcript map and the embedded text map and provide the topic visual element for display with the digital video on the client device.

In one or more embodiments, the third-party system 114 stores and/or presents digital videos. For example, in one or more embodiments, the third-party system 114 can be accessed by a client device (e.g., one of the client devices 110a-110n) and can provide, in response, functionality by which the client device can access, view, search for, and/or interact with digital videos. In other words, in one or more embodiments, the third-party system 114 operates similarly to the video presentation system 104. In some embodiments, the third-party system 114 operates as a digital video database, and a client device can access digital videos stored on the third-party system 114 via the video presentation system 104.

In one or more embodiments, the client devices 110a-110n include computing devices that can access and display digital videos, as well as topic visual elements. For example, the client devices 110a-110n can include smartphones, tablets, desktop computers, laptop computers, or other electronic devices. The client devices 110a-110n can include one or more applications (e.g., the client application 112) that can access and display digital videos, as well as topic visual elements. For example, the client application 112 can include a software application installed on the client devices 110a-110n. Additionally, or alternatively, the client application 112 can include a software application hosted on the server(s) 102, which may be accessed by the client devices 110a-110n through another application, such as a web browser.

The video topic generation system 106 can be implemented in whole, or in part, by the individual elements of the system 100. Indeed, although FIG. 1 illustrates the video topic generation system 106 implemented with regard to the server(s) 102, different components of the video topic generation system 106 can be implemented in a variety of the components of the system 100. For example, one or more components of the video topic generation system 106—including all components of the video topic generation system 106—can be implemented by a computing device (e.g., one of the client devices 110a-110n). Example components of the video topic generation system 106 will be discussed in more detail below with regard to FIG. 9.

Figure 2:
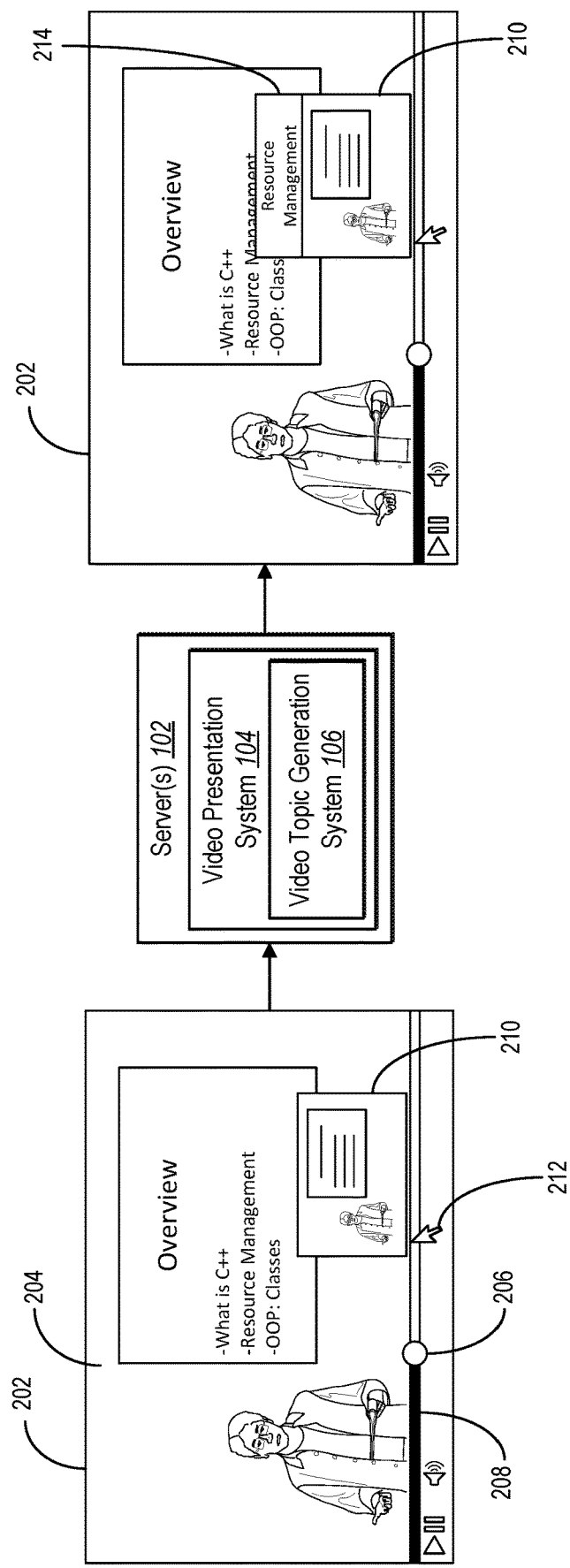
FIG. 2 illustrates a block diagram of the video topic generation system generating a topic visual element in accordance with one or more embodiments.

As mentioned above, the video topic generation system 106 can generate a topic visual element for a portion of a digital video. FIG. 2 illustrates a block diagram of the video topic generation system 106 generating a topic visual element 214 in accordance with one or more embodiments. While the discussion regarding FIG. 2 (as well as many of the subsequent figures) may discuss the digital video 202 including or displaying certain features (e.g., a scrub bar, a digital video indicator, play button, a volume button, a preview thumbnail) it will be understood that, in one or more embodiments, some or all of these features are provided by a video presentation system (e.g., the video presentation system 104 or the third-party system 114).

As illustrated in FIG. 2, the video topic generation system 106 identifies a digital video 202. In one or more embodiments, the video topic generation system 106 identifies the digital video 202 by receiving the digital video 202 from an external source, such as a computing device. In some embodiments, the video topic generation system 106 identifies the digital video 202 from a database storing digital videos. In still further embodiments, the video topic generation system 106 identifies the digital video 202 upon detecting access of the digital video 202. For example, the video topic generation system 106 can store the digital video 202 in a database and detect when a computing device accesses the digital video 202. In some embodiments, a third-party system stores the digital video 202, and the video topic generation system 106 detects when a computing device accesses the digital video 202 via the third-party system.

As shown in FIG. 2, the digital video 202 displays a video frame 204. Indeed, the video frame 204 represents a video frame of the digital video 202 currently displayed as part of a portion of the digital video 202 displayed while a computing device plays the digital video 202 or in response to the computing device pausing the digital video 202. Further, the digital video 202 includes a digital video indicator 206 and a scrub bar 208. The digital video indicator 206 can move across the scrub bar 208 while the computing device plays the digital video 202 or as a user navigates the digital video 202 to indicate the portion of the digital video 202 that is currently playing. Indeed, as shown in FIG. 2, the digital video indicator 206 is associated with the video frame 204, indicating the point of the digital video 202 at which the video frame 204 occurs relative to the time frame of the digital video 202.

As further shown in FIG. 2, the digital video 202 includes the preview thumbnail 210. In particular, the preview thumbnail 210 displays a video frame of the digital video corresponding to a portion of the digital video 202 associated with a position of an input indicator 212 at the scrub bar 208. Thus, the preview thumbnail 210 can provide a preview of the contents of the digital video 202 based on a position of the input indicator 212 at the scrub bar 208. Indeed, the preview thumbnail 210 can provide a preview of a portion of the digital video 202 that occurs before or after a currently displayed portion of the digital video 202. The preview thumbnail 210 can also provide a preview of the currently displayed portion of the digital video 202, such as when the input indicator 212 is positioned at or near the digital video indicator 206.

As illustrated in FIG. 2, the video topic generation system 106 can analyze the digital video 202 to generate and provide a topic visual element 214. Indeed, as will be discussed in more detail below, the video topic generation system 106 can analyze audio content and visual content of the digital video 202 in order to generate the topic visual element 214. The topic visual element 214 displays the topic of a portion of the digital video 202. In particular, the topic visual element 214 displays the topic of the portion of the digital video 202 corresponding to the preview thumbnail 210.

By generating and providing topic visual elements, the video topic generation system 106 can provide a clear representation of the topic associated with that portion of the digital video 202. Indeed, the video topic generation system 106 can improve upon the inaccuracies of conventional systems by more clearly conveying, via a topic visual element, the contents of a portion of the digital video where the preview thumbnails representing the contents of the digital video may look the same. By improving upon the accuracy of conveying the contents of a digital video, the video topic generation system 106 can further improve upon the inefficiencies of conventional systems. Indeed, the video topic generation system 106 improves the navigability of a digital video, reducing the amount of computing resources and/or time required to do so.

Figure 3:
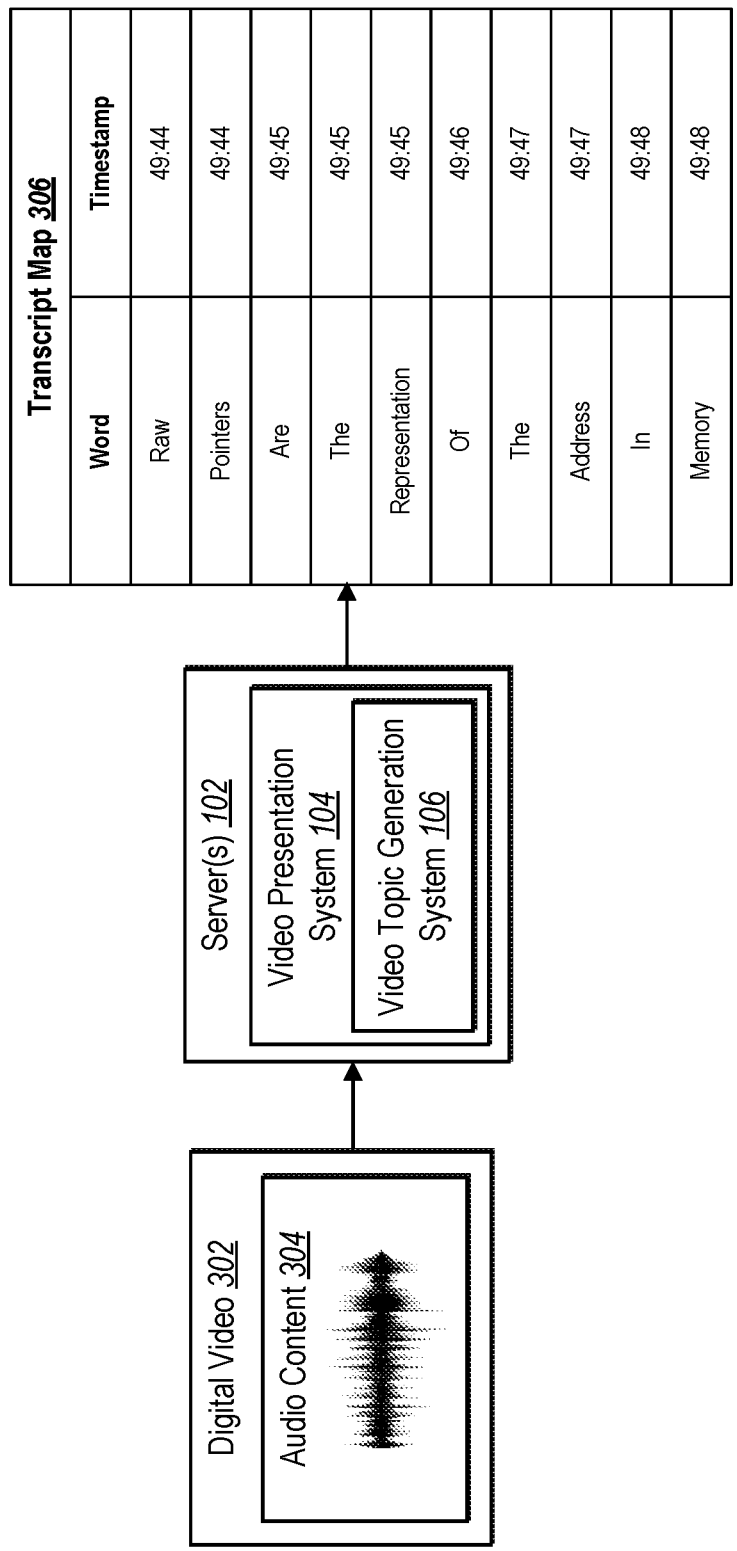
FIG. 3 illustrates a block diagram of the video topic generation system generating a transcript map based on audio content of a digital video in accordance with one or more embodiments.

As mentioned above, the video topic generation system 106 can generate a topic visual element for a portion of a digital video based, at least in part, on the audio content of the digital video. Indeed, the video topic generation system 106 can analyze the audio content and generate the topic visual element based on the analysis. By generating topic visual elements based, at least partly, on the audio content of a digital video, the video topic generation system 106 can accurately convey the topics of the digital video even when the visual elements of the digital video remain the same. FIG. 3 illustrates a block diagram of the video topic generation system 106 analyzing audio content 304 of a digital video 302 in accordance with one or more embodiments.

As shown in FIG. 3, the video topic generation system 106 generates a transcript map 306 based on the audio content 304 of the digital video 302 (i.e., based on an analysis of the audio content 304). To illustrate, in one or more embodiments, the video topic generation system 106 analyzes the audio content 304 utilizing speech-to-text conversion. Indeed, the video topic generation system 106 can utilize the speech-to-text conversion to generate text based on words of the audio content 304 (e.g., speech included in the audio content). The video topic generation system 106 can use various different algorithms or models to perform the speech-to-text conversion. For example, in one or more embodiments, the video topic generation system 106 utilizes a library of algorithms, such as STT Lib, to process the audio content 304 and generate the corresponding text.

As further shown in FIG. 3, the video topic generation system 106 generates the transcript map 306 by associating the words of the audio content 304 with timestamps of the digital video 302 (e.g., <word>, <timestamp>). In particular, the video topic generation system 106 can associate the textual representation of the words from the audio content 304 as generated by the speech-to-text conversion with the corresponding timestamps from the digital video 302. In one or more embodiments, the video topic generation system 106 associates every word of the audio content 304 with corresponding timestamps. In some embodiments, however, the video topic generation system 106 associates a subset of the words of the audio content 304 with corresponding timestamps. For example, in some embodiments, the video topic generation system 106 excludes pre-determined words—such as "the" or "in"—from the transcript map 306.

Figure 4A:
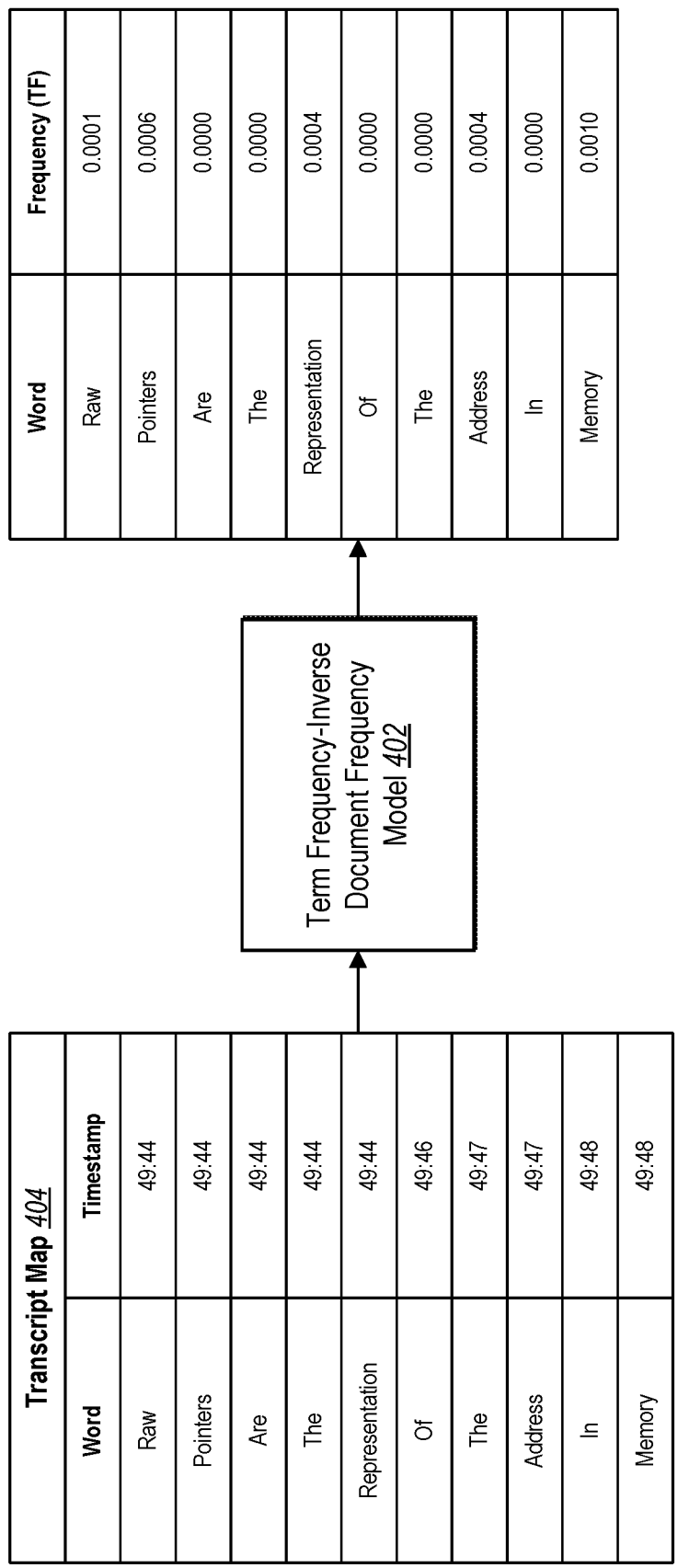
FIGS. 4A-4B illustrate block diagrams illustrating an overview of determining importance weights for words of audio content in accordance with one or more embodiments.
Figure 4B:
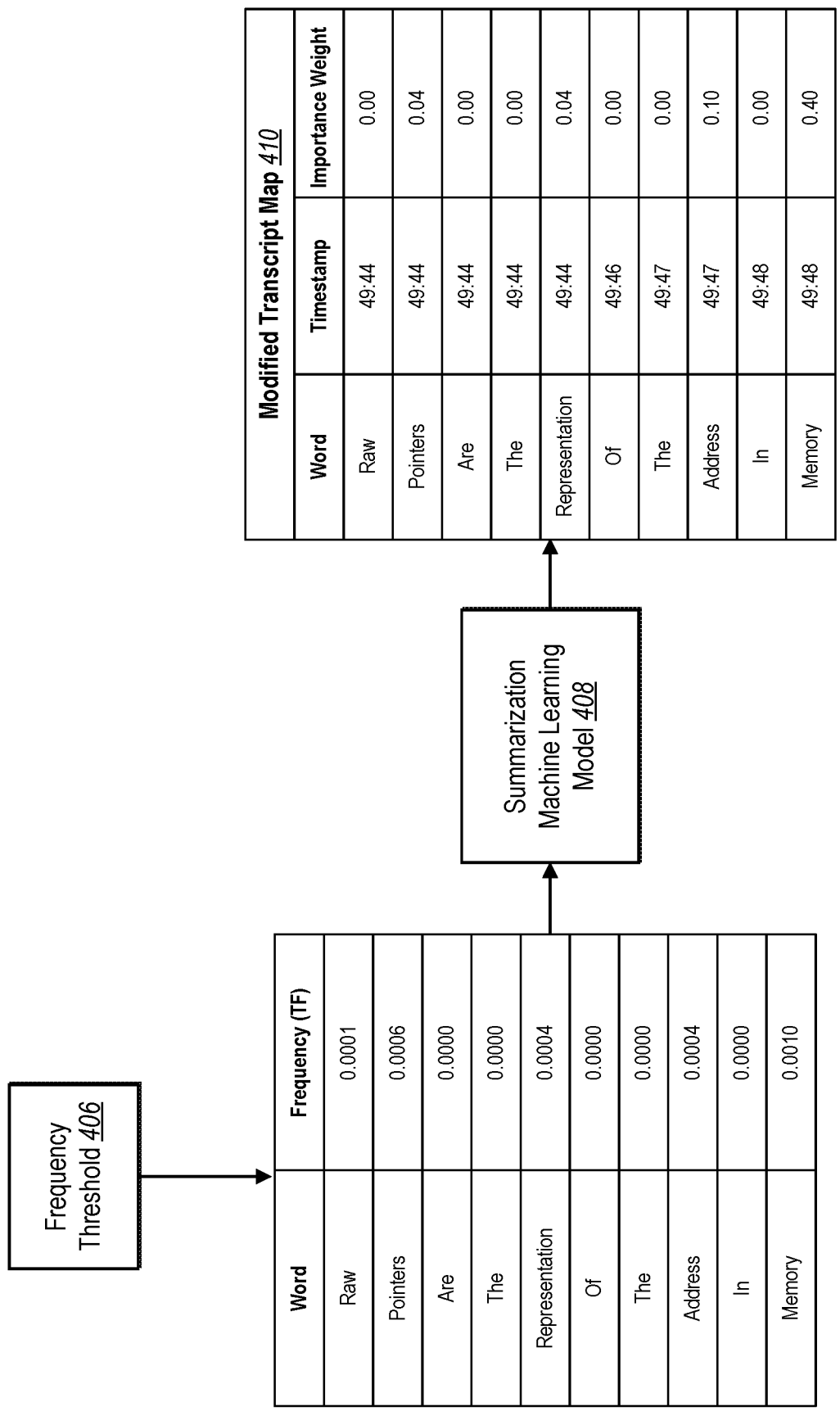

In one or more embodiments, the video topic generation system 106 modifies the transcript map (e.g., generated as described above with regard to FIG. 3) by associating importance weights with the words of the audio content of a digital video (e.g., the audio content 304). In one or more embodiments, the video topic generation system 106 associates importance weights with the words based on the frequency of the words. FIGS. 4A-4B illustrate a block diagram of associating importance weights with the words of audio content in accordance with one or more embodiments.

In particular, FIG. 4A illustrates a block diagram of the video topic generation system 106 determining a frequency of the words of audio content of a digital video. As shown, the video topic generation system 106 utilizes a term frequency-inverse document frequency model 402 to determine the frequency of the words. Indeed, as illustrated in FIG. 4A, the video topic generation system 106 can utilize the term frequency-inverse document frequency model 402 to analyze the transcript map 404 in order to determine the frequency of words. In some embodiments, however, the video topic generation system 106 utilizes the term frequency-inverse document frequency model 402 to analyze other data related to the words of the audio content. For example, the term frequency-inverse document frequency model 402 can analyze a raw transcript of the audio content to determine the frequency of the words.

In one or more embodiments, the term frequency-inverse document frequency model 402 determines the frequency of a word TF based on a raw count TC of the appearance of the word in the transcript map 404. Indeed, the term frequency-inverse document frequency model 402 can determine the frequency of the word TF as follows:

$$TF(w,d)=TC(w,d)/|d| \qquad (1)$$

In algorithm 1, w corresponds to the word and |d| corresponds to the number of words included in the audio content (e.g., the number of words in the transcript map 404). In one or more embodiments, the term frequency-inverse document frequency model 402 determines the frequency of the various words of the audio content (e.g., the words included in the transcript map 404) using algorithm 1. In some embodiments, the term frequency-inverse document frequency model 402 offsets the value of TF for a particular word (e.g., using a weighting factor) based on the appearance of that word in one or more other segments of text (e.g., other transcripts or transcript maps).

FIG. 4B illustrates a block diagram of the video topic generation system 106 determining and associating importance weights with the words of the audio content based on the determined frequencies of the words. As shown in FIG. 4B, the video topic generation system 106 can determine whether the frequency of a given word satisfies a frequency threshold 406. In one or more embodiments, the frequency threshold 406 includes a predetermined frequency value. The video topic generation system 106 can compare the frequency of a given word to the frequency threshold 406 to determine whether the frequency of the word satisfies the frequency threshold 406 (e.g. equals or exceeds the frequency value). Based on determining that the frequency of a word satisfies the frequency threshold, the video topic generation system 106 generates an importance weight for the word. Indeed, as shown in FIG. 4B, the video topic generation system 106 generates the importance weight utilizing the summarization machine learning model 408. In one or more embodiments, the video topic generation system 106 generates importance weights for the words having the highest frequency as determined by the term frequency-inverse document frequency model 402 (e.g., the ten words having the highest frequency). In some embodiments, the video topic generation system 106 generates importance weights for the words that satisfy the frequency threshold 406 and are among the words having the highest frequency.

In one or more embodiments, the video topic generation system 106 trains the summarization machine learning model 408 using a set of training documents and corresponding training extracts. In particular, a training extract can include one or more sentences that have been extracted from a corresponding training document.

In one or more embodiments, the video topic generation system 106 trains the summarization machine learning model 408 by converting sentences from the training documents into feature vectors. For example, the video topic generation system 106 can convert the sentences into the feature vectors using a word2vec algorithm or a Global Vectors (GloVe) algorithm. For example, in one or more embodiments, the video topic generation system 106 converts sentences into feature vectors as described by C. McCormick, Word2Vec Resources, 2016, http://mccormickml.com/2016/04/27/word2vec-resources/, which is incorporated herein by reference in its entirety.

The summarization machine learning model 408 can process the feature vectors corresponding to a training document and generate a binary label (i.e., 0 or 1) that predicts whether the sentence corresponding to a particular feature vector is included in the extracted summary for that training document. The video topic generation system 106 can compare the predicted binary label with a ground truth (i.e., the training extract corresponding to the training document) to determine a loss. Based on the loss, the video topic generation system 106 can modify parameters of the summarization machine learning model 408 (e.g., via back propagation). The video topic generation system 106 can train the summarization machine learning model 408 using several iterations of providing a training document, comparing the resulting predicted binary label to a ground truth, and modifying the model parameters. With each iteration of training, the video topic generation system 106 gradually increases the accuracy with which the summarization machine learning model 408 can determine a quantitative value corresponding to the importance of words.

After training, the video topic generation system 106 can utilize the summarization machine learning model 408 to generate importance weights for those words having a frequency that satisfies the frequency threshold 406. Indeed, in one or more embodiments, the video topic generation system 106 trains the summarization machine learning model 408 based on sentences of training documents but uses the summarization machine learning model 408 to generate importance weights for individual words.

The video topic generation system 106 can convert those words satisfying the frequency threshold 406 into feature vectors (e.g., using the word2vec algorithm). Based on the feature vector corresponding to a word, the video topic generation system 106 can utilize the summarization machine learning model 408 to generate an importance weight for that word. In one or more embodiments, the importance weight for a word includes a value between 0 and 1. The video topic generation system 106 can modify the transcript map 404 by associating the importance weights with the words (e.g., <word>, <timestamp>, <importance weight>, as shown by the modified transcript map 410). In one or more embodiments, the video topic generation system 106 assigns a low importance weight or an importance weight of 0 to those words having a frequency that failed to satisfy the frequency threshold 406. In some embodiments, the video topic generation system 106 excludes words failing to satisfy the frequency threshold 406 from the modified transcript map 410 entirely.

The video topic generation system 106 can use various implementations of a summarization machine learning model 408. In particular, the video topic generation system 106 can use an extractive model or an abstractive model. For example, the summarization machine learning model 408 can include an implementation of various models, such as Gensim, TextTeaser, PyTeaser, or pytextrank.

Figure 5:
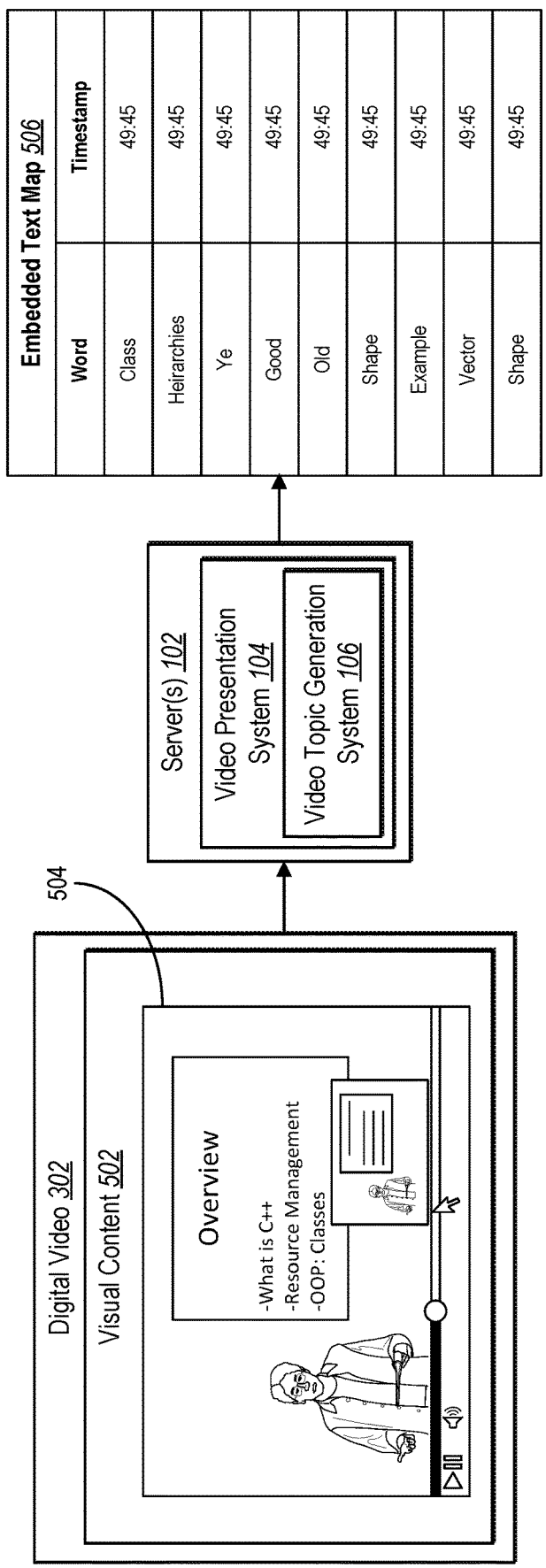
FIG. 5 illustrates a block diagram of the video topic generation system generating an embedded text map based on visual content of the digital video in accordance with one or more embodiments.

As mentioned, the video topic generation system 106 can generate a topic visual element for a portion of a digital video further based on the visual content of the digital video. Indeed, the video topic generation system 106 can analyze the visual content and generate the topic visual element based on the analysis. FIG. 5 illustrates a block diagram of the video topic generation system 106 analyzing visual content 502 of the digital video 302 in accordance with one or more embodiments.

As shown in FIG. 5, the visual content 502 includes a video frame 504 of the digital video 302. Indeed, though not shown in the figure, the visual content 502 can include a plurality of additional video frames of the digital video 302. Further, as shown in FIG. 5, the video frame 504 includes a plurality of embedded words. Indeed, generally speaking, visual content of a digital video can include one or more video frames that include at least one embedded word.

As shown in FIG. 5, the video topic generation system 106 generates an embedded text map 506 based on the visual content 502 of the digital video 302 (i.e., based on an analysis of the visual content 502). In particular, in one or more embodiments, the video topic generation system 106 analyzes the visual content 502 to extract embedded words from video frames (e.g., the video frame 504) of the digital video 302. For example, in some embodiments, the video topic generation system 106 analyzes the visual content 502 using optical character recognition to identify the embedded words from the video frames of the digital video 302 (i.e., of the visual content 502).

To provide an example, in one or more embodiments, the video topic generation system 106 utilizes adaptive optical character recognition to accurately fix the video frames of the digital video 302 as per the content geometry. The video topic generation system 106 can then run optical character recognition to extract the textual content (i.e., the embedded words) from the fixed video frames. In one or more embodiments, while running the optical character recognition, the video topic generation system 106 determines whether a word returned by the optical character recognition is present in a localized dictionary. For example, upon determining that the embedded words are generally provided in English, the video topic generation system 106 can determine whether a given embedded word is included in an English dictionary. In one or more embodiments, upon determining that an embedded word is not included in the localized dictionary, the video topic generation system 106 excludes that word from the embedded text map 506.

As further shown in FIG. 5, the video topic generation system 106 generates the embedded text map 506 by associating the embedded words from the video frames of the digital video 302 with corresponding timestamps of the digital video 302 (e.g., <embedded word>, <timestamp>). For example, in one or more embodiments, the video topic generation system 106 associates the embedded words form the video frames as identified and extracted by the optical character recognition with the corresponding timestamps from the digital video 302. In one or more embodiments, the video topic generation system 106 associates every embedded word from the video frames with corresponding timestamps. In some embodiments, however, the video topic generation system 106 associates a subset of the embedded words with corresponding timestamps. For example, in some embodiments, the video topic generation system 106 excludes pre-determined words—such as "the" or "in"—from the embedded text map 506.

Figure 6:
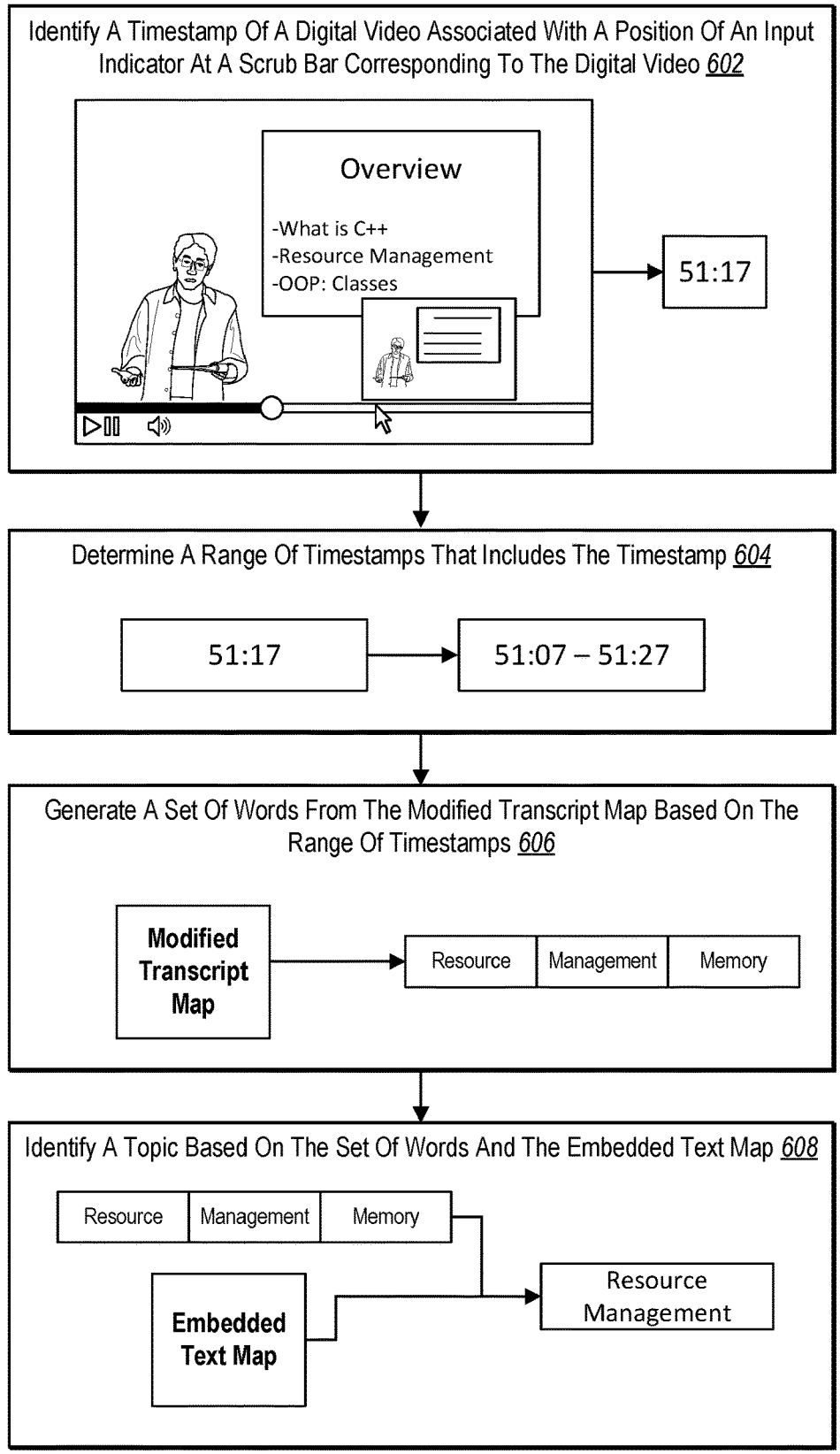
FIG. 6 illustrates an overview of a sequence of acts for identifying a topic for a portion of a digital video in accordance with one or more embodiments.

As previously mentioned, in one or more embodiments, the video topic generation system 106 identifies a topic for a portion of a digital video based on the modified transcript map and the embedded text map corresponding to the digital video. FIG. 6 illustrates an overview of a sequence of acts that the video topic generation system 106 performs for identifying a topic for a portion of a digital video in accordance with one or more embodiments.

For instance, as shown in FIG. 6, the video topic generation system 106 performs an act 602 of identifying a timestamp of a digital video associated with a position of an input indicator at a scrub bar corresponding to the digital video. Indeed, the video topic generation system 106 can detect, on a user interface displayed on a computing device, a position of an input indicator (e.g., a cursor) at a point of a scrub bar corresponding to the digital video. In response to detecting the position of the input indicator, the video topic generation system 106 can identify a timestamp (denoted Tu) of the digital video associated with the position of the input indicator at the point of the scrub bar. In one or more embodiments, the point of the scrub bar at which the input indicator is positioned is associated with a particular portion of the digital video. Accordingly, by identifying the timestamp Tu, the video topic generation system 106 can identify the portion of the digital video associated with the point of the scrub bar at which the input indicator is positioned.

Furthermore, as illustrated in FIG. 6, the video topic generation system 106 performs an act 604 of determining a range of timestamps that includes the timestamp Tu. In one or more embodiments, the video topic generation system 106 determines (e.g., identifies) a range of timestamps that includes the timestamp Tu of the digital video associated with the position of the input indicator at the point of the scrub bar, a set of timestamps occurring prior to the timestamp, and a set of timestamps occurring subsequent to the timestamp (i.e., Tu±n). For example, the video topic generation system 106 can determine the range of timestamps to include timestamps preceding the timestamp Tu by up to ten seconds and timestamps following the timestamp Tu by up to ten seconds (i.e., n=10).

As further shown in FIG. 6, the video topic generation system 106 performs an act 606 of determining a set of words from the modified transcript map based on the range of timestamps. In particular, the video topic generation system 106 can determine a set of words that includes words that are associated with the range of timestamps (i.e., are associated with a timestamp falling within the range of timestamps). In one or more embodiments, the video topic generation system 106 determines the set of words to include a pre-determined number of words. For example, the video topic generation system 106 can determine the set of words to include the k top-weighted words from a portion of the modified transcript map associated with the range of timestamps (e.g., having words that fall within the range of timestamps) where k includes a pre-determined value. In one or more embodiments, the video topic generation system 106 stores the set of words within a vector.

Additionally, as shown in FIG. 6, the video topic generation system 106 performs an act 608 of identifying a topic based on the set of words and the embedded text map. For example, in one or more embodiments, the video topic generation system 106 performs a reverse search in the embedded text map to compare words from the embedded text map and words from the set of words. In particular, the video topic generation system 106 can compare words from the set of words with words from a portion of the embedded text map associated with the range of timestamps. In one or more embodiments, the video topic generation system 106 identifies the topic by identifying a match between a word from the set of words and a word from the portion of the embedded text map associated with the range of timestamps. The video topic generation system 106 can identify a match between words using various methods (e.g., determining that the words are exactly equivalent, determining that the words satisfy a similarity threshold etc.)

In one or more embodiments, the video topic generation system 106 can determine that multiple words from the set of words match with words from the portion of the embedded text map associated with the range of timestamps. In some embodiments, the video topic generation system 106 determines that an additional match corresponds to a subtopic. For example, when comparing words from the set of words and the portion of the embedded text map, the video topic generation system 106 can begin with the first word from the set of words and progress through the subsequent words up to the last word from the set of words. The video topic generation system 106 can determine that a first match between words corresponds to the topic and that a second match corresponds to a subtopic.

In some embodiments, the video topic generation system 106 determines that there is no match between words from the set of words and words form the portion of the embedded text map associated with the range of timestamps. Indeed, the video topic generation system 106 can determine that the portion of the embedded text map does not include a matching word corresponding to a word from the set of words. Consequently, the video topic generation system 106 can determine that the top-weighted word from the set of words corresponds to the topic. Thus, while much of the present disclosure discusses identifying topics and generating topic visual elements based on the audio content and visual content of a digital video, the video topic generation system can identify topics and generate topic visual elements based on the audio content alone in some embodiments.

By identifying a topic for a portion of a digital video based, at least partly, on the audio content of the digital video, the video topic generation system 106 can operate more flexibly than conventional systems. Indeed, by analyzing the audio content, the video topic generation system 106 can identify a topic based on more information than provided by the visual content of the digital video alone. Thus, while the visual content may not change significantly in appearance throughout the duration of the digital video (resulting in similar-looking preview thumbnails), the video topic generation system 106 can identify a topic for one portion of the digital video that may be different than another portion of the digital video. Accordingly, the video topic generation system 106 can further operate more accurately by identifying topics based on a greater collection of available information.

Figure 7:
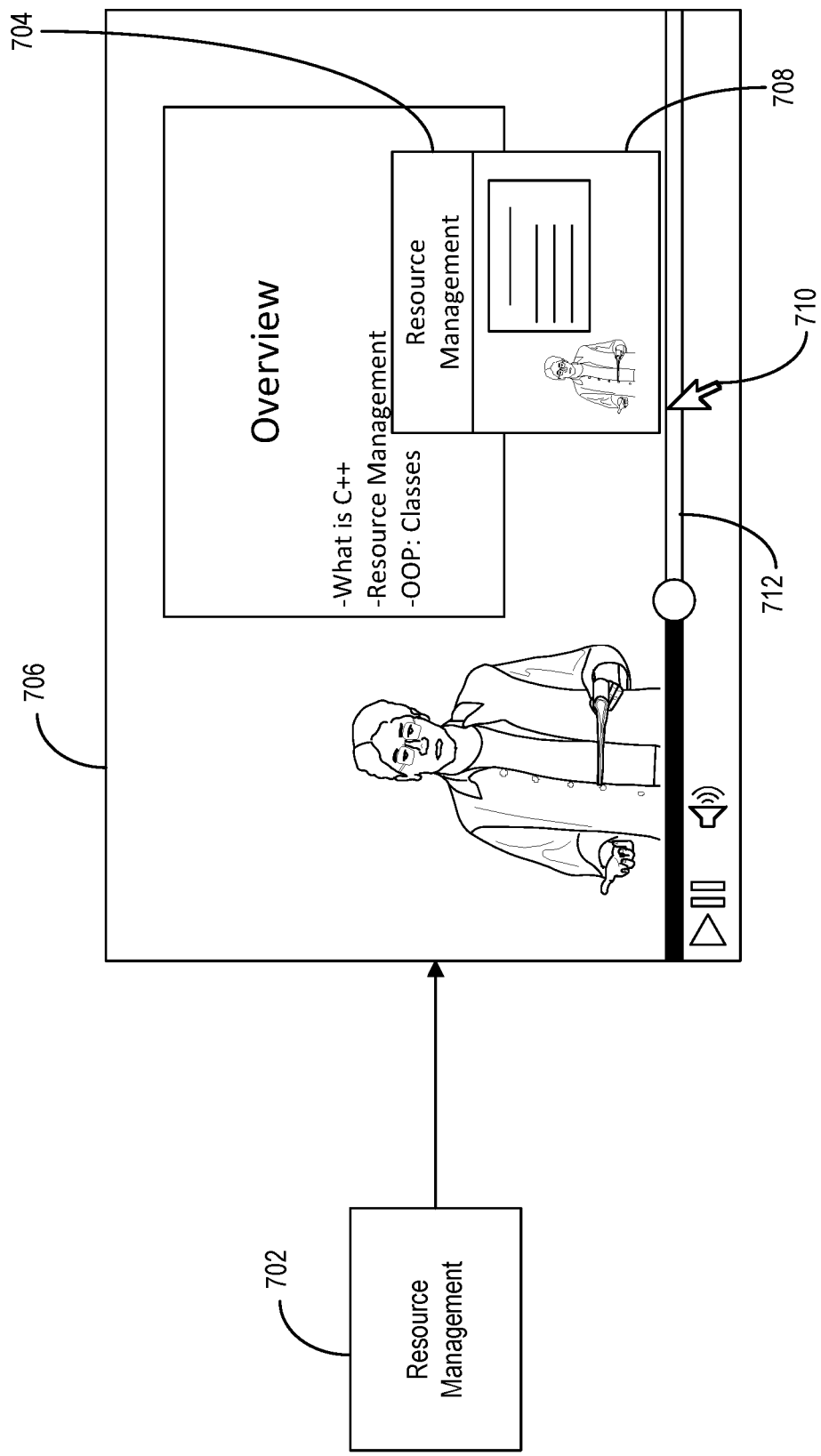
FIG. 7 illustrates a topic visual element provided in connection with a video thumbnail in accordance with one or more embodiments.

As mentioned above, the video topic generation system 106 can generate a topic visual element for a portion of a digital video. FIG. 7 illustrates an overview of generating a topic visual element in accordance with one or more embodiments. As shown in FIG. 7, the video topic generation system 106 generates the topic visual element 704 for a portion of the digital video 706 based on an identified topic 702 (e.g., a topic identified as described above with reference to FIG. 6). As further shown, the topic visual element 704 can include a textual representation of the identified topic 702.

As further shown in FIG. 7, the video topic generation system 106 can append the topic visual element 704 to a scrub-bar-preview thumbnail 708 associated with a portion of the digital video 706 (i.e., associated with the position of an input indicator 710 at a point of a scrub bar 712 corresponding to the digital video 706). Where the video topic generation system 106 has identified one or more subtopics corresponding to the topic of the topic visual element 704, the topic visual element 704 can include the subtopic(s).

As illustrated in FIG. 7, the video topic generation system 106 can generate and provide the topic visual element 704 in real time. Indeed, the video topic generation system 106 can detect that the input indicator 710 is positioned at a particular point at the scrub bar 712 corresponding to the digital video 706. The video topic generation system 106 can, in response to detecting the position of the input indicator, and in real time, determine the timestamp corresponding to the position of the input indicator 710, determine a range of timestamps that includes that timestamp, generate a set of words from the modified transcript map based on the range of timestamps, compare those words to the words from the embedded text map, identify a topic based on the comparison, and generate the topic visual element 704. Accordingly, the video topic generation system 106 can provide the topic visual element 704 for display with the digital video 706 on the computing device while the input indicator 710 is positioned at the point of the scrub bar 712 associated with the portion of the digital video. In one or more embodiments, the video topic generation system 106 generates the modified transcript map and the embedded text map at some previous time but generates and provides topic visual elements in real time as the input indicator moves about the scrub bar 712 of the digital video 706.

In some embodiments, however, the video topic generation system 106 identifies topics and generates topic visual elements for the digital video 706 at some time prior to a user viewing or a computing device displaying the digital video 706. For example, in one or more embodiments, the video topic generation system 106 segments the digital video 706 into several intervals (e.g., 20 second intervals). The video topic generation system 106 can then identify a topic and generate a corresponding topic visual element for one or more of the intervals. The video topic generation system 106 can then provide a topic visual element for a portion of the digital video 706 for display upon detecting the input indicator 710 positioned at a point at the scrub bar 712 associated with the portion of the digital video 706.

It should be noted that, although the present disclosure generally discusses analyzing individual words of the audio content and visual content of a digital video, the video topic generation system 106 can analyze groups of words (e.g., phrases and/or sentences) in one or more embodiments. Indeed, the video topic generation system 106 can identify entire groups of words as a topic. In some embodiments, the video topic generation system 106 analyzes the words of the audio content and visual content individually but identifies a group of words as the topic upon determining that the matching word is associated with a group of words (e.g., is part of a common phrase used in the digital video).

Thus, in one or more embodiments, the video topic generation system 106 can identify a digital video having audio content and visual content. The video topic generation system 106 can analyze the audio content and the visual content in order to identify a topic for a portion of the digital video and generate a corresponding topic visual element. The algorithms and acts described with reference to FIGS. 2-7 can comprise the corresponding structure for performing a step for generating a topic visual element for a portion of the digital video based on the audio content and the visual content of the digital video.

By generating and providing topic visual elements based on the audio content and visual content of a digital video, the video topic generation system 106 can operate more flexibly than conventional systems. Indeed, by generating and providing topic visual elements based on the audio content and visual content of a digital video, the video topic generation system 106 can identify and convey the topics of a digital video without the need for manual user input. Further, by generating and providing topic visual elements in real time (e.g., as a user positions an input indicator over a scrub bar corresponding to the digital video) the video topic generation system 106 can flexibly avoid the limitations of providing such information at the time the digital video is created.

Figure 8:
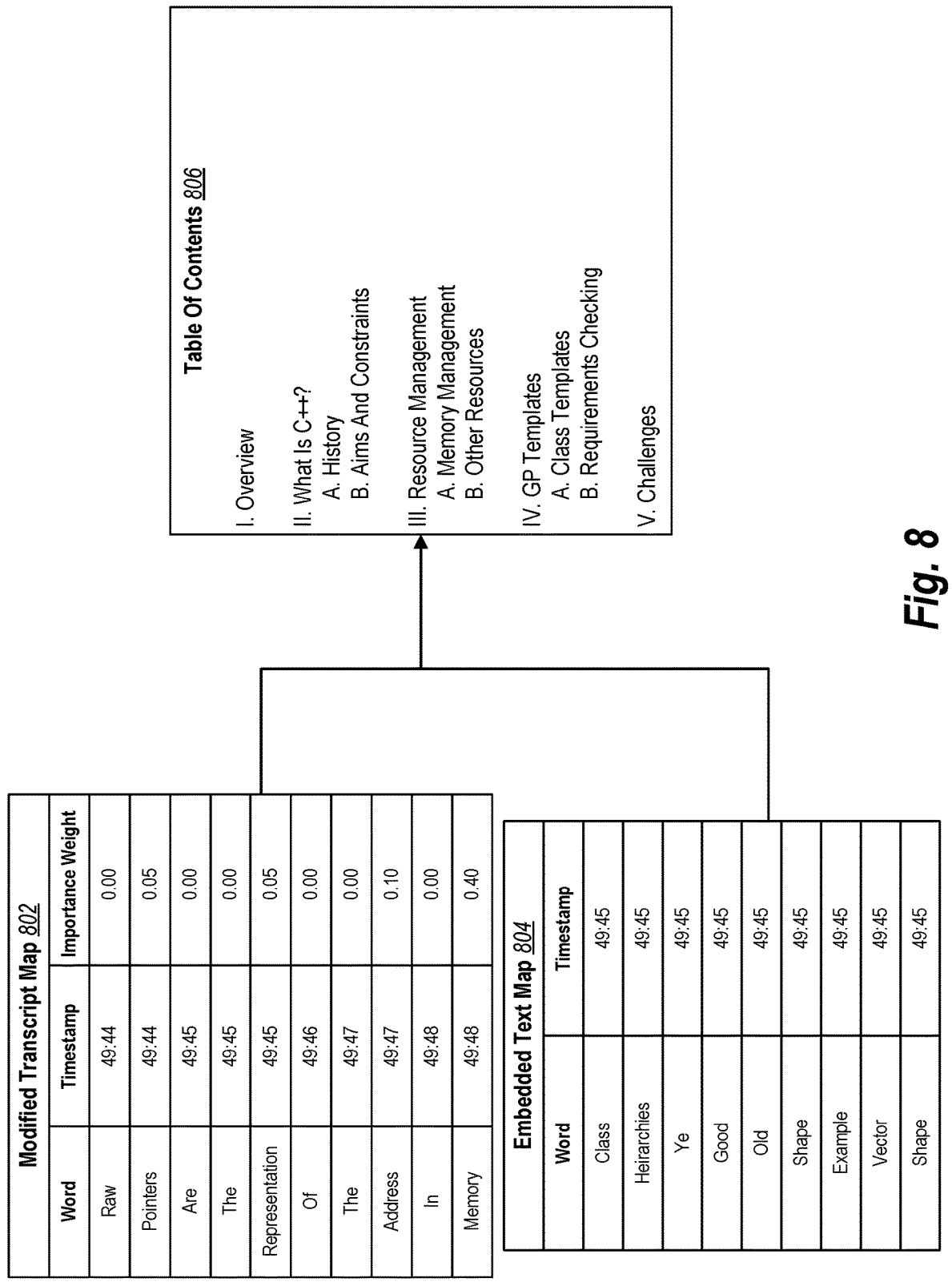
FIG. 8 illustrates a block diagram of generating a table of contents including topics determined by the video topic generation system in accordance with one or more embodiments.

As previously mentioned, the video topic generation system 106 can generate a table of contents for a digital video based on the audio content and the visual content of the digital video. For example, the video topic generation system 106 can generate the table of contents based on the modified transcript map generated based on the audio content and the embedded text map generated based on the visual content. FIG. 8 illustrates a block diagram of generating a table of contents 806 in accordance with one or more embodiments. As shown in FIG. 8, the video topic generation system 106 identifies topics (and subtopics) based on the modified transcript map 802 and the embedded text map 804 and compiles the topics (and subtopics) to generate the table of contents 806. In one or more embodiments, the table of contents 806 includes topics corresponding to the topic visual elements generated for various portions of the digital video.

In one or more embodiments, the video topic generation system 106 provides the table of contents 806 for display on a computing device. In particular, the video topic generation system 106 can provide the table of contents 806 for display with the digital video. Indeed, as mentioned above, the video topic generation system 106 can identify topics for a digital video at a time prior to a user viewing the digital video. Accordingly, the video topic generation system 106 can generate the table of contents 806, which includes those identified topics, before a user views the digital video. In one or more embodiments, the video topic generation system 106 provides the table of contents 806 for display within an initial frame of the digital video. In some embodiments, the video topic generation system 106 provides the table of contents 806 for display within a description area corresponding to the digital video.

In one or more embodiments, the video topic generation system 106 configures the table of contents 806 to facilitate navigation of the corresponding digital video. For example, in some embodiments, the video topic generation system 106 generates the table of contents 806 so the included topics (and subtopics) comprise links to the corresponding portions of the digital video. Accordingly, the video topic generation system 106 can detect a user selection of a topic from the table of contents 806. In response to detecting the user selection of the topic, the video topic generation system 106 can provide the portion of the digital video for display on a computing device (i.e., the computing device with which the user made the selection).

Figure 9:
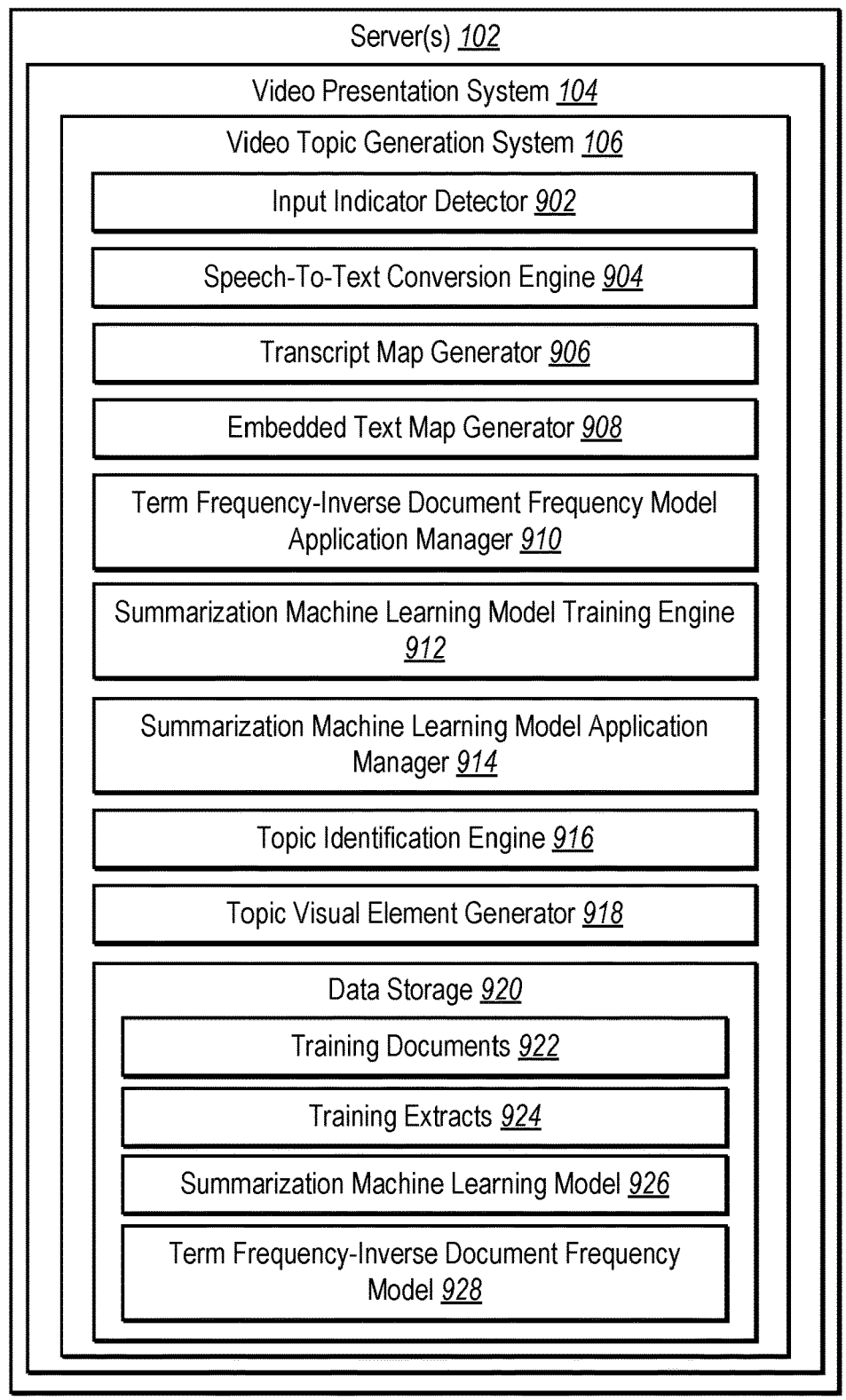
FIG. 9 illustrates an example schematic diagram of a video topic generation system in accordance with one or more embodiments.

Turning now to FIG. 9, additional detail will now be provided regarding various components and capabilities of the video topic generation system 106. In particular, FIG. 9 illustrates the video topic generation system 106 implemented by the server(s) 102 and the video presentation system 104. As shown, the video topic generation system 106 can include, but is not limited to, an input indicator detector 902, a speech-to-text conversion engine 904, a transcript map generator 906, an embedded text map generator 908, a term frequency-inverse document frequency model application manager 910, a summarization machine learning model training engine 912, a summarization machine learning model application manager 914, a topic identification engine 916, a topic visual element generator 918, and data storage 920 (which includes training documents 922, training extracts 924, a summarization machine learning model 926, and a term frequency-inverse document frequency model 928).

As just mentioned, and as illustrated in FIG. 9, the video topic generation system 106 includes the input indicator detector 902. In particular, the input indicator detector 902 can detect the positioning and interaction of an input detector with respect to a computing device, such as the positioning and interaction with a user interface displayed on a computing device. For example, the input indicator detector 902 can detect the position of an input detect with respect to a scrub bar corresponding to a digital video (e.g., a point of the scrub bar at which the input indicator is positioned).

Additionally, as shown in FIG. 9, the video topic generation system 106 includes the speech-to-text conversion engine 904. In particular, the speech-to-text conversion engine 904 can analyze audio content and generate text corresponding to speech included in the audio content. For example, the speech-to-text conversion engine 904 can generate text based on the speech included in the audio content of a digital video.

Further, as shown in FIG. 9, the video topic generation system 106 includes the transcript map generator 906. In particular, the transcript map generator 906 can generate a transcript map based on the audio content of a digital video. For example, the transcript map generator 906 can generate a transcript map based on the text generated by the speech-to-text conversion engine 904. The transcript map generator 906 can generate a transcript map by associating the words of the audio content of the digital video with timestamps of the digital video. In one or more embodiments, the transcript map generator 906 can further modify the transcript map by associating importance weights with the words of the audio content. For example, the transcript map generator 906 can associate importance weights generated by the summarization machine learning model application manager 914 with the words of the audio content within the transcript map.

As shown in FIG. 9, the video topic generation system 106 further includes the embedded text map generator 908. In particular, the embedded text map generator 908 can generate an embedded text map based on the visual content of a digital video. For example, the embedded text map generator 908 can analyze one or more video frames of the visual content (e.g., using optical character recognition) and identify words embedded in the video frames. The embedded text map generator 908 can generate the embedded text map by associating the embedded words from the video frames with corresponding timestamps of the digital video.

As shown in FIG. 9, the video topic generation system 106 also includes the term frequency-inverse document frequency model application manager 910. In particular, the term frequency-inverse document frequency model application manager 910 can determine the frequency of words of the audio content. For example, the term frequency-inverse document frequency model application manager 910 can analyze the transcript map generated by the transcript map generator 906 to determine a frequency for the words of the audio content.

Further, as shown in FIG. 9, the video topic generation system 106 includes the summarization machine learning model training engine 912. In particular, the summarization machine learning model training engine 912 trains a summarization machine learning model to generate weights for audio content words. In one or more embodiments, the summarization machine learning model training engine 912 trains the summarization machine learning model using training documents and corresponding training extracts. The summarization machine learning model training engine 912 can use the summarization machine learning model to predict whether a sentence from a training document appears in the corresponding training extract, compare the prediction to the training extract, and modify parameters of the summarization machine learning model based on the comparison.

Additionally, as shown in FIG. 9, the video topic generation system 106 includes the summarization machine learning model application manager 914. In particular, the summarization machine learning model application manager 914 can utilize the summarization machine learning model trained by the summarization machine learning model training engine 912 to generate importance weights for the words of the audio content included in the transcript map. In one or more embodiments, the summarization machine learning model application manager 914 utilizes the summarization machine learning model to generate importance weights for words based on the frequency of those words determined by the term frequency-inverse document frequency model application manager 910 (e.g., based on whether a given word satisfies a frequency threshold).

As shown in FIG. 9, the video topic generation system 106 also includes the topic identification engine 916. In particular, the topic identification engine 916 can identify a topic for a portion of a digital video. For example, the topic identification engine 916 can compare words from the modified transcript map generated by the transcript map generator 906 and the embedded text map generated by the embedded text map generator 908 to identify a match. In one or more embodiments, the topic identification engine 916 specifically compares words from a portion of the modified transcript map and a portion of the embedded text map that correspond to the portion of the digital video.

Indeed, as discussed above, the video topic generation system 106 can identify a topic for the portion of a digital video in real time. Accordingly, based on the input indicator detector 902 detecting that an input indicator is positioned at a point of a scrub bar that is associated with the portion of the digital video, the topic identification engine 916 can identify a timestamp of the digital video associated with the position of the input indicator (i.e., associated with the portion of the digital video). The topic identification engine 916 can further determine a range of timestamps that includes the timestamp associated with the position of the input indicator and generate a set of words from the modified transcript that are associated with the range of timestamps. The topic identification engine 916 can identify a topic for the portion of the digital video by comparing the words from the set of words with words from the embedded text map that fall within that range of timestamps.

Additionally, as discussed above, the video topic generation system 106 can identify the topic for the portion of the digital video a time prior to a user viewing the digital video. As an example, the topic identification engine 916 can segment the digital video into intervals (e.g., twenty-second intervals) and identify a topic for each interval. Whether identifying topics in real time or at some previous time, the topic identification engine 916 can further identify one or more subtopics corresponding to the identified topics.

Further, as shown in FIG. 9, the video topic generation system 106 includes the topic visual element generator 918. In particular, the topic visual element generator 918 can generate a topic for the portion of the digital video based on the topic identified by the topic identification engine 916. Where the topic identification engine 916 has identified one or more subtopics corresponding to the topic, the topic visual element generator 918 can generate the topic visual element to include the subtopic(s). The topic visual element generator 918 can provide the topic visual element for display on a computing device.

In one or more embodiments, the topic visual element generator 918 generates a table of contents for the digital video. Indeed, the topic visual element generator 918 can generate a table of contents that includes all topics and subtopics identified for a digital video. The topic visual element generator 918 can provide the table of contents for display with the digital video (e.g., as an initial frame of the digital video).

Additionally, as shown in FIG. 9, the video topic generation system 106 includes data storage 920. In particular, data storage 920 includes training documents 922, training extracts 924, a summarization machine learning model 926, and a term frequency-inverse document frequency model 928. The training documents 922 and the training extracts 924 can store the training documents and training extracts, respectively, used by the summarization machine learning model training engine 912 to train the summarization machine learning model 926. The summarization machine learning model 926 can store the summarization machine learning model trained by the summarization machine learning model training engine 912 and used by the summarization machine learning model application manager 914 to generate importance weights for words of audio content. The term frequency-inverse document frequency model 928 can store the term frequency-inverse document frequency model utilized by the term frequency-inverse document frequency model application manager 910 to determine the frequency of words of the audio content.

Each of the components 902-928 of the video topic generation system 106 can include software, hardware, or both. For example, the components 902-928 can include one or more instructions stored on a computer-readable storage medium and executable by processors of one or more computing devices, such as a client device or server device. When executed by the one or more processors, the computer-executable instructions of the video topic generation system 106 can cause the computing device(s) to perform the methods described herein. Alternatively, the components 902-928 can include hardware, such as a special-purpose processing device to perform a certain function or group of functions. Alternatively, the components 902-928 of the video topic generation system 106 can include a combination of computer-executable instructions and hardware.

Furthermore, the components 902-928 of the video topic generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-928 of the video topic generation system 106 may be implemented as a stand-alone application, such as a desktop or mobile application. Furthermore, the components 902-928 of the video topic generation system 106 may be implemented as one or more web-based applications hosted on a remote server. Alternatively, or additionally, the components 902-928 of the video topic generation system 106 may be implemented in a suite of mobile device applications or "apps." For example, in one or more embodiments, the video topic generation system 106 can comprise or operate in connection with digital software applications such as ADOBE® CREATIVE CLOUD® or ADOBE® FLASH® PLAYER. "ADOBE," "CREATIVE CLOUD," and "FLASH" are either registered trademarks or trademarks of Adobe Inc. in the United States and/or other countries.

Figure 10:
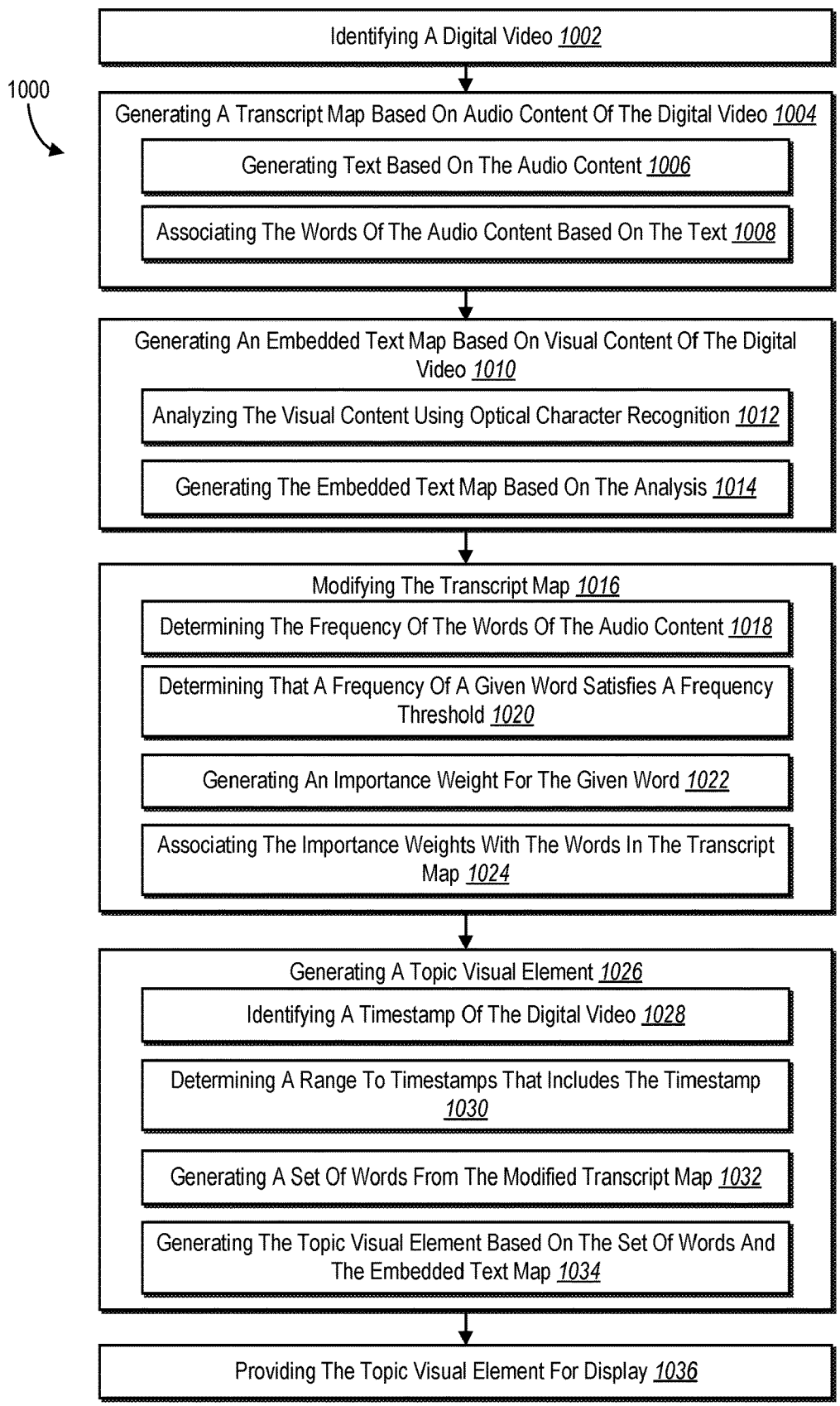
FIG. 10 illustrates a flowchart of a series of acts for generating a topic visual element for a portion of a digital video in accordance with one or more embodiments.

FIGS. 1-9, the corresponding text and the examples provide a number of different methods, systems, devices, and non-transitory computer-readable media of the video topic generation system 106. In addition to the foregoing, one or more embodiments can also be described in terms of flowcharts comprising acts for accomplishing the particular results, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

As mentioned, FIG. 10 illustrates a flowchart of a series of acts 1000 for generating a topic visual element for a portion of a digital video in accordance with one or more embodiments. While FIG. 10 illustrates acts according to one embodiment, alternative embodiments may omit, add to, reorder and/or modify any of the acts shown in FIG. 10. The acts of FIG. 10 can be performed as part of a method. For example, in some embodiments, the acts of FIG. 10 can be performed, in a digital medium environment for presenting digital videos, as part of a computer-implemented method. Alternatively, a non-transitory computer-readable medium can store instructions that, when executed by at least one processor, cause a computing device to perform the acts of FIG. 10. In some embodiments, a system can perform the acts of FIG. 10. For example, in one or more embodiments, a system includes at least one memory device comprising a digital video comprising audio content and visual content and a summarization machine learning model trained to generate weights for audio content words. The system can further include at least one server device that causes the system to perform the acts of FIG. 10.

The series of acts 1000 includes an act 1002 of identifying a digital video. For example, the act 1002 involves identifying a digital video comprising audio content and visual content. In one or more embodiments, the video topic generation system 106 identifies the digital video by receiving the digital video from a client device or a third-party system. In some embodiments, the video topic generation system 106 identifies the digital video within a database. In still further embodiments, the video topic generation system 106 identifies the digital video by detecting access of the digital video by a computing device.

The series of acts 1000 also includes an act 1004 of generating a transcript map based on audio content of the digital video. For example, the act 1004 involves generating a transcript map, based on the audio content of the digital video, by associating words of the audio content with timestamps of the digital video. The act 1004 includes the sub-act 1006 of generating text based on the audio content. Indeed, in one or more embodiments, the video topic generation system 106 generates the text utilizing speech-to-text conversion. The act 1004 further includes the sub-act 1008 of associating the words of the audio content based on the text. Indeed, the video topic generation system 106 can generate the transcript map by associating the textual representation of the words of the audio content with the corresponding timestamps of the digital video.

Further, the series of acts includes an act 1010 of generating an embedded text map based on visual content of the digital video. For example, the act 1010 involves generating an embedded text map, based on the visual content of the digital video, by associating embedded words from video frames of the digital video with corresponding timestamps of the digital video. The act 1010 includes the sub-act 1012 of analyzing the visual content using optical character recognition. For example, the sub-act 1012 involves analyzing the visual content using optical character recognition to identify the embedded words from the video frames of the digital video. The act 1010 further includes the sub-act 1014 of generating the embedded text map based on the analysis. For example, the sub-act 1014 can include associating the embedded words from the video frames of the digital video with the corresponding timestamps of the digital video based on the analysis Additionally, the series of acts includes an act 1016 of modifying the transcript map. For example, the act 1016 involves modifying the transcript map by associating importance weights with the words of the audio content. The act 1016 includes the sub-act 1018 of determining a frequency of the words of the audio content. For example, the sub-act 1018 can involve determining a frequency of the words of the audio content using a term frequency-inverse document frequency model. The video topic generation system 106 can associate the importance weights with the words of the audio content based on the frequency. Indeed, in one or more embodiments, based on the frequency of the words, the video topic generation system 106 utilizes a summarization machine learning model to generate importance weights for the words For example, the act 1016 includes the sub-act 1020 of determining that a frequency of a given word satisfies a frequency threshold. The act 1016 further includes the sub-act 1022 of generating an importance weight for the given word. For example, the sub-act 1022 can involve generating an importance weight for the given word utilizing a summarization machine learning model, trained to generate weights for audio content words, based on determining that the frequency of the given word satisfies the frequency threshold. Further, the act 1016 includes the sub-act 1024 of associating the importance weights with the words in the transcript map, which can include associating the importance weight—that was generated for the given word—with the given word.

The series of acts further includes an act 1026 of generating a topic visual element. For example, the act 1026 involves generating a topic visual element for a portion of the digital video based on the modified transcript map and the embedded text map.

In one or more embodiments, the video topic generation system 106 detects, on a user interface displayed on a computing device, a position of an input indicator at a point of a scrub bar corresponding to the digital video, the point of the scrub bar being associated with the portion of the digital video. Accordingly, the video topic generation system 106 can generate the topic visual element for the portion of the digital video in response to detecting the position of the input indicator at the point of the scrub bar associated with the portion of the digital video. For example, the act 1026 includes the sub-act 1028 of identifying a timestamp of the digital video. In particular, the sub-act 1028 involves identifying a timestamp of the digital video associated with the position of the input indicator at the point of the scrub bar associated with the portion of the digital video. Further, the act 1026 includes the sub-act 1030 of determining a range of timestamps that includes the timestamp. In particular, the sub-act 1030 involves determining a range of timestamps comprising the timestamp of the digital video associated with the position of the input indicator at the point of the scrub bar. Indeed, in one or more embodiments, the range of timestamps can include the timestamp of the digital video associated with the position of the input indicator at the point of the scrub bar, a set of timestamps occurring prior to the timestamp, and a set of timestamps occurring subsequent to the timestamp. Additionally, the act 1026 includes the sub-act 1032 of generating a set of words from the modified transcript map. For example, the sub-act 1032 involves generating a set of words from the modified transcript map that are associated with the range of timestamps. In one or more embodiments, generating the set of words includes generating a set of words comprising one or more top-weighted words from a portion of the modified transcript map associated with the range of timestamps. The act 1026 also includes the sub-act 1034 of generating the topic visual element based on the set of words and the embedded text map. In particular, the sub-act 1034 involves generating the topic visual element for the portion of the digital video based on the set of words and the embedded text map.

In one or more embodiments, the video topic generation system 106 generates the topic visual element for the portion of the digital video based on the modified transcript map and the embedded text map by identifying a match between a word from the modified transcript map and a word from the embedded text map, the word from the modified transcript map and the word from the embedded text map both being associated with the portion of the digital video; and generating the topic visual element based on the identified match. In some embodiments, the video topic generation system 106 generates the topic visual element for the portion of the digital video based on the modified transcript map and the embedded text map by determining that a portion of the embedded text map does not include a matching word corresponding to a word from a portion of the modified transcript map, the portion of the embedded text map and the portion of the modified transcript map corresponding to the portion of the digital video; and, based on determining that the portion of the embedded text map does not include the matching word, generating the topic visual element for the portion of the digital video based on a top-weighted word from the portion of the modified transcript map.

In one or more embodiments, the video topic generation system 106 can determine a subtopic for the portion of the digital video based on the modified transcript map and the embedded text map. Accordingly, the visual topic element can include the subtopic. To provide an example, the video topic generation system 106 can identify a first match between a word from the modified transcript map and a word from the embedded text map, the word from the modified transcript map and the word from the embedded text map both being associated with the portion of the digital video; and generate the topic visual element based on the first match. Further, the video topic generation system 106 can identify a second match between an additional word from the modified transcript map and an additional word from the embedded text map, the additional word from the modified transcript map and the additional word from the embedded text map both being associated with the portion of the digital video; and determine a subtopic for the portion of the digital video based on the second match. Accordingly, the topic visual element can include the subtopic.

The series of acts also includes an act 1036 of providing the topic visual element for display. For example, the act 1036 involves providing the topic visual element for display with the digital video on the computing device. In one or more embodiments, providing the topic visual element for display with the digital video on the computing device comprises appending the topic visual element to a scrub-bar-preview thumbnail associated with the portion of the digital video for display on the computing device. In one or more embodiments where the video topic generation system 106 generates the topic visual element in response to detecting a position of an input indicator at a point of a scrub bar associated with the portion of the digital video, the video topic generation system 106 can provide the topic visual element for display with the digital video on the computing device while the input indicator is positioned at the point of the scrub bar associated with the portion of the digital video.

In one or more embodiments, the series of acts 1000 further includes acts for generating and providing a table of contents for the digital video. For example, in one or more embodiments, the acts include generating a table of contents for the digital video based on the modified transcript map and the embedded text map, the table of contents comprising a topic corresponding to the topic visual element for the portion of the digital video; and providing the table of contents for display on the computing device. In some embodiments, the acts further include detecting a user selection of the topic corresponding to the topic visual element from the table of contents; and, in response to detecting the user selection of the topic, providing the portion of the digital video for display on the computing device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
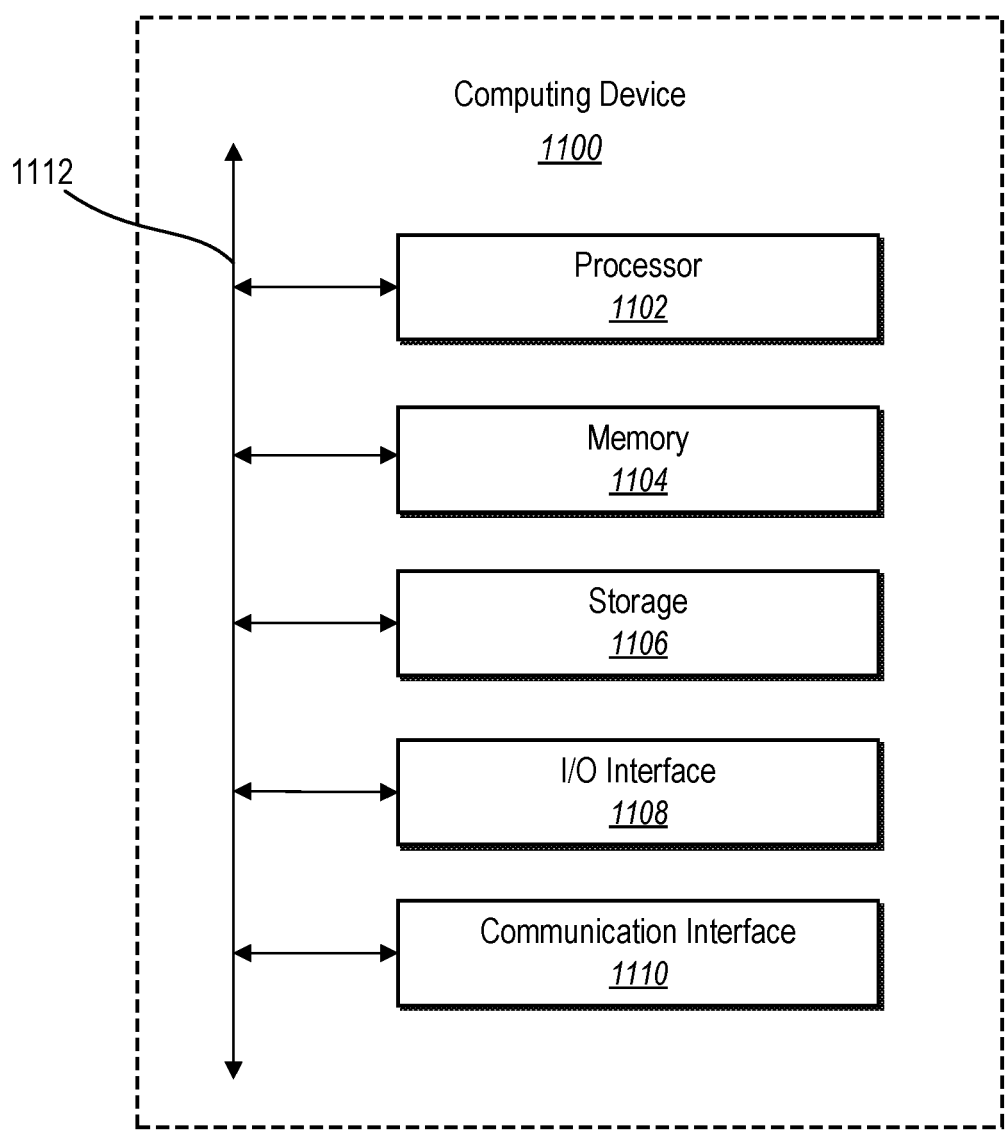
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102, the client devices 110a-110n, and/or the third-party system 114). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface

1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to:
   identify a digital video comprising audio content and visual content;
   generate a transcript map, based on the audio content of the digital video, by associating words of the audio content with timestamps of the digital video;
   generate an embedded text map, based on the visual content of the digital video, by associating embedded words from video frames of the digital video with corresponding timestamps of the digital video;
   modify the transcript map by associating importance weights with the words of the audio content;
   generate a topic visual element for a portion of the digital video based on the modified transcript map and the embedded text map; and
   provide the topic visual element for display with the digital video on a computing device.

2. The non-transitory computer-readable medium of claim 1, further comprising instructions that, when executed by the at least one processor, cause the at least one processor to detect, on a user interface displayed on the computing device, a position of an input indicator at a point of a scrub bar corresponding to the digital video, the point of the scrub bar being associated with the portion of the digital video, wherein the instructions, when executed by the at least one processor, cause the computing device to generate the topic visual element for the portion of the digital video in response to detecting the position of the input indicator at the point of the scrub bar associated with the portion of the digital video.

3. The non-transitory computer-readable medium of claim 2, wherein the instructions, when executed by the at least one processor, cause the at least one processor to generate the topic visual element for the portion of the digital video in response to detecting the position of the input indicator at the point of the scrub bar associated with the portion of the digital video by:
   identifying a timestamp of the digital video associated with the position of the input indicator at the point of the scrub bar associated with the portion of the digital video;
   determining a range of timestamps comprising the timestamp of the digital video associated with the position of the input indicator at the point of the scrub bar;
   generating a set of words from the modified transcript map that are associated with the range of timestamps; and
   generating the topic visual element for the portion of the digital video based on the set of words and the embedded text map.

4. The non-transitory computer-readable medium of claim 1, wherein the instructions, when executed by the at least one processor, cause the at least one processor to generate the topic visual element for the portion of the digital video based on the modified transcript map and the embedded text map by:
   identifying a match between a word from the modified transcript map and a word from the embedded text map, the word from the modified transcript map and the word from the embedded text map both being associated with the portion of the digital video; and
   generating the topic visual element based on the identified match.

5. The non-transitory computer-readable medium of claim 1, wherein the instructions, when executed by the at least one processor, cause the at least one processor to generate the topic visual element for the portion of the digital video based on the modified transcript map and the embedded text map by:
   determining that a portion of the embedded text map does not include a matching word corresponding to a word from a portion of the modified transcript map, the portion of the embedded text map and the portion of the modified transcript map corresponding to the portion of the digital video; and
   based on determining that the portion of the embedded text map does not include the matching word, generating the topic visual element for the portion of the digital video based on a top-weighted word from the portion of the modified transcript map.

6. The non-transitory computer-readable medium of claim 1, further comprising instructions that, when executed by the at least one processor, cause the at least one processor to:
   determine a subtopic for the portion of the digital video based on the modified transcript map and the embedded text map,
   wherein the topic visual element comprises the subtopic.

7. The non-transitory computer-readable medium of claim 1, wherein the instructions, when executed by the at least one processor, cause the at least one processor to provide the topic visual element for display with the digital video on the computing device by appending the topic visual element to a scrub-bar-preview thumbnail associated with the portion of the digital video for display on the computing device.

8. The non-transitory computer-readable medium of claim 1, further comprising instructions that, when executed by the at least one processor, cause the at least one processor to:
generate a table of contents for the digital video based on the modified transcript map and the embedded text map, the table of contents comprising a topic corresponding to the topic visual element for the portion of the digital video; and
provide the table of contents for display on the computing device.

9. The non-transitory computer-readable medium of claim 8, further comprising instructions that, when executed by the at least one processor, cause the at least one processor to:
detect a user selection of the topic corresponding to the topic visual element from the table of contents; and
in response to detecting the user selection of the topic, provide the portion of the digital video for display on the computing device.

10. The non-transitory computer-readable medium of claim 1, wherein the instructions, when executed by the at least one processor, cause the at least one processor to modify the transcript map by associating the importance weights with the words of the audio content by:
determining a frequency of the words of the audio content using a term frequency-inverse document frequency model; and
associating the importance weights with the words of the audio content based on the frequency.

11. The non-transitory computer-readable medium of claim 10, wherein associating the importance weights with the words of the audio content based on the frequency comprises:
determining that a frequency of a given word satisfies a frequency threshold;
generating an importance weight for the given word utilizing a summarization machine learning model, trained to generate weights for audio content words, based on determining that the frequency of the given word satisfies the frequency threshold; and
associating the importance weight with the given word.

12. A system comprising:
at least one memory device comprising:
a digital video comprising audio content and visual content; and
a summarization machine learning model trained to generate weights for audio content words; and
at least one server device that causes the system to:
generate a transcript map, based on the audio content of the digital video, by associating words of the audio content with timestamps of the digital video;
generate an embedded text map, based on the visual content of the digital video, by associating embedded words from video frames of the digital video with corresponding timestamps of the digital video;
modify the transcript map by:
determining a frequency of the words of the audio content;
based on the frequency of the words, utilizing the summarization machine learning model to generate importance weights for the words; and
associating the importance weights with the words in the transcript map;
generate a topic visual element for a portion of the digital video based on the modified transcript map and the embedded text map; and
provide the topic visual element for display with the digital video on a computing device.

13. The system of claim 12, wherein the at least one server device causes the system to:
detect, on a user interface displayed on the computing device, a position of an input indicator at a point of a scrub bar corresponding to the digital video, the point of the scrub bar being associated with the portion of the digital video;
generate the topic visual element for the portion of the digital video in response to detecting the position of the input indicator at the point of the scrub bar; and
provide the topic visual element for display with the digital video on the computing device while the input indicator is positioned at the point of the scrub bar associated with the portion of the digital video.

14. The system of claim 13, wherein the at least one server device causes the system to generate the topic visual element for the portion of the digital video in response to detecting the position of the input indicator at the point of the scrub bar associated with the portion of the digital video by:
identifying a timestamp of the digital video associated with the position of the input indicator at the point of the scrub bar associated with the portion of the digital video;
determining a range of timestamps comprising the timestamp of the digital video associated with the position of the input indicator at the point of the scrub bar, a set of timestamps occurring prior to the timestamp, and a set of timestamps occurring subsequent to the timestamp;
generating a set of words comprising one or more top-weighted words from a portion of the modified transcript map associated with the range of timestamps; and
generating the topic visual element for the portion of the digital video based on the set of words and the embedded text map.

15. The system of claim 12, wherein the at least one server device causes the system to generate the topic visual element for the portion of the digital video based on the modified transcript map and the embedded text map by:
identifying a first match between a word from the modified transcript map and a word from the embedded text map, the word from the modified transcript map and the word from the embedded text map both being associated with the portion of the digital video; and
generating the topic visual element based on the first match.

16. The system of claim 15, wherein the at least one server device causes the system to:
identify a second match between an additional word from the modified transcript map and an additional word from the embedded text map, the additional word from the modified transcript map and the additional word from the embedded text map both being associated with the portion of the digital video; and
determine a subtopic for the portion of the digital video based on the second match,
wherein the topic visual element comprises the subtopic.

17. The system of claim 12, wherein the at least one server device causes the system to generate the embedded text map based on the visual content of the digital video by:
analyzing the visual content using optical character recognition to identify the embedded words from the video frames of the digital video; and associating the embedded words from the video frames of the digital video with the corresponding timestamps of the digital video based on the analysis.

18. In a digital medium environment for presenting digital videos, a computer-implemented method comprising:
- identifying a digital video comprising audio content and visual content;
- performing a step for generating a topic visual element for a portion of the digital video based on the audio content and the visual content of the digital video; and
- providing the topic visual element for display with the digital video on a computing device.

19. The computer-implemented method of claim 18, further comprising:
- detecting, on a user interface displayed on the computing device, a position of an input indicator at a point of a scrub bar corresponding to the digital video, the point of the scrub bar being associated with the portion of the digital video,
- wherein providing the topic visual element for display with the digital video on the computing device is in response to detecting the position of the input indicator at the point of the scrub bar associated with the portion of the digital video.

20. The computer-implemented method of claim 18, further comprising:
- generating a table of contents for the digital video based on the audio content and the visual content, the table of contents comprising a topic corresponding to the topic visual element for the portion of the digital video; and
- providing the table of contents for display on the computing device.

* * * * *